(12) United States Patent
Gude

(10) Patent No.: US 11,763,524 B2
(45) Date of Patent: Sep. 19, 2023

(54) LAYERED MESHING FOR ADDITIVE MANUFACTURING SIMULATIONS

(71) Applicant: Ansys, Inc., Canonsburg, PA (US)

(72) Inventor: Venkata Narayana Gude, Pune (IN)

(73) Assignee: Ansys, Inc., Canonsburg, PA (US)

( * ) Notice: Subject to any disclaimer, the term of this patent is extended or adjusted under 35 U.S.C. 154(b) by 597 days.

(21) Appl. No.: 16/665,747

(22) Filed: Oct. 28, 2019

(65) Prior Publication Data
US 2021/0082182 A1  Mar. 18, 2021

(30) Foreign Application Priority Data

Sep. 13, 2019 (IN) .............................. 201941036917

(51) Int. Cl.
| | |
|---|---|
| *G06T 17/20* | (2006.01) |
| *G06T 15/08* | (2011.01) |
| *B29C 64/393* | (2017.01) |
| *G06F 30/23* | (2020.01) |
| *B33Y 50/02* | (2015.01) |
| *G06F 119/18* | (2020.01) |

(52) U.S. Cl.
CPC ............ *G06T 17/20* (2013.01); *B29C 64/393* (2017.08); *G06F 30/23* (2020.01); *G06T 15/08* (2013.01); *B33Y 50/02* (2014.12); *G06F 2119/18* (2020.01)

(58) Field of Classification Search
CPC ....... G06T 17/20; G06T 15/08; B29C 64/393; G06F 30/23
USPC ............................................................ 703/1
See application file for complete search history.

(56) References Cited

U.S. PATENT DOCUMENTS

| | | | |
|---|---|---|---|
| 6,445,390 B1* | 9/2002 | Aftosmis ................ G06T 17/20 345/423 |
| 6,879,324 B1* | 4/2005 | Hoppe .................. G06T 17/205 345/428 |
| 8,970,590 B1* | 3/2015 | Brennan ................. G06T 17/20 345/581 |
| 9,824,493 B1* | 11/2017 | Chen ..................... G06T 17/205 |
| 10,121,279 B1* | 11/2018 | Sundaram ............... G06T 15/20 |
| 10,657,301 B1* | 5/2020 | Park ....................... G06F 30/23 |
| 10,706,623 B1* | 7/2020 | Seibold .................. B33Y 50/00 |
| 10,769,850 B1* | 9/2020 | DeSimone ............ G06T 17/205 |
| 10,803,661 B1* | 10/2020 | Menon ............... G06F 3/04842 |

(Continued)

FOREIGN PATENT DOCUMENTS

| | | | | |
|---|---|---|---|---|
| EP | 3418979 A1 * | 12/2018 | ............. | B29C 53/04 |
| WO | WO-2016044006 A1 * | 3/2016 | ........... | B29C 64/106 |

(Continued)

OTHER PUBLICATIONS

Livesu et al. (slice2mesh: a Meshing Tool for the Simulation of Additive Manufacturing Processes, Computers & Graphics (2019), pp. 1-14) (Year: 2019).*

(Continued)

*Primary Examiner* — Iftekhar A Khan
(74) *Attorney, Agent, or Firm* — Jones Day

(57) ABSTRACT

Systems and methods are provided herein for a layered volume mesh of a physical object in an additive manufacturing process. A surface mesh representing the physical object is sliced and layered into a plurality of virtual layer planes. The surface mesh includes a plurality of nodes. Volume meshing of the modified surface mesh is performed to generate the layered volume mesh.

20 Claims, 25 Drawing Sheets

(56) References Cited

U.S. PATENT DOCUMENTS

| | | | | |
|---|---|---|---|---|
| 2005/0038549 | A1* | 2/2005 | Loughran | G05B 19/4083 |
| | | | | 700/119 |
| 2007/0097117 | A1* | 5/2007 | Chien | G06T 17/20 |
| | | | | 345/420 |
| 2007/0273688 | A1* | 11/2007 | Chen | G06T 17/20 |
| | | | | 345/420 |
| 2012/0109594 | A1* | 5/2012 | Grape | G06F 30/15 |
| | | | | 703/1 |
| 2012/0203512 | A1* | 8/2012 | Shah | G06T 17/20 |
| | | | | 703/1 |
| 2015/0201500 | A1* | 7/2015 | Shinar | H05K 3/4685 |
| | | | | 425/132 |
| 2016/0086376 | A1* | 3/2016 | Tang | B29C 64/386 |
| | | | | 345/420 |
| 2016/0246908 | A1* | 8/2016 | Komzsik | B29C 67/00 |
| 2017/0116779 | A1* | 4/2017 | Lalish | B33Y 50/00 |
| 2017/0120554 | A1* | 5/2017 | Giloh | D06N 3/0095 |
| 2017/0129179 | A1* | 5/2017 | Mandel | B29C 64/393 |
| 2018/0166251 | A1* | 6/2018 | Yuan | B23K 15/0033 |
| 2018/0293792 | A1* | 10/2018 | Pavanaskar | G06F 30/23 |
| 2018/0361510 | A1* | 12/2018 | Stamp | B22F 10/28 |
| 2019/0035150 | A1* | 1/2019 | Owechko | G01B 11/24 |
| 2019/0118476 | A1* | 4/2019 | Damiano | B33Y 50/02 |
| 2020/0009862 | A1* | 1/2020 | Shih | B41J 2/04586 |
| 2020/0027269 | A1* | 1/2020 | Jiang | G06T 19/20 |
| 2020/0142384 | A1* | 5/2020 | Bressler | B33Y 50/00 |
| 2020/0242204 | A1* | 7/2020 | Noviello | G06F 30/17 |
| 2020/0292239 | A1* | 9/2020 | Wiedenhoefer | F28F 7/02 |
| 2021/0012049 | A1* | 1/2021 | Sieger | G06F 30/23 |
| 2021/0019939 | A1* | 1/2021 | Hu | G06T 3/0037 |
| 2021/0069482 | A1* | 3/2021 | Ryu | A61M 37/0015 |
| 2021/0082182 | A1* | 3/2021 | Gude | B29C 64/386 |

FOREIGN PATENT DOCUMENTS

| | | | | |
|---|---|---|---|---|
| WO | WO-2016133679 | A1* | 8/2016 | B29C 64/386 |
| WO | WO-2018140019 | A1* | 8/2018 | B22F 10/20 |
| WO | WO-2021073719 | A1* | 4/2021 | G06F 30/20 |

OTHER PUBLICATIONS

Minetto et al. (An optimal algorithm for 3D triangle mesh slicing, Computer-Aided Design 92 (2017) 1-10) (Year: 2017).*

Livesu, Marco, Cabiddu, Daniela, Attene, Marco; slice2mesh: a Meshing Tool for the Simulation of Additive Manufacturing Processes; Computer and Graphics, 80; CNR IMATI, Genoa, Italy; Mar. 2019.

* cited by examiner

LAYERED MESHING FOR ADDITIVE MANUFACTURING SIMULATIONS

CROSS-REFERENCE TO RELATED APPLICATIONS

This application claims priority to Indian Application No. 201941036917, filed Sep. 13, 2019, entitled "Layered Meshing for Additive Manufacturing Simulations," which is incorporated herein by reference in its entirety.

TECHNICAL FIELD

The present disclosure relates generally to the field of engineering simulation, and, more specifically, to computer-aided design models and additive manufacturing.

BACKGROUND

Computer-aided design (CAD) models can be useful in various engineering efforts involved in developing and/or testing of a particular physical, real world object. Using three-dimensional (3D) printing or additive manufacturing, a 3D object can be fabricated by depositing successive layers of material using a CAD model. Simulation of the additive manufacturing process utilizes volume meshes. An optimum volume mesh represents the layers of the object being fabricated without significant deviation from the geometry of the 3D object (i.e., the distance between volume mesh boundary and CAD surface at a given location) with optimal element count (i.e., not too many mesh elements). Traditionally, additive simulation time highly depends on volume mesh element count. Too few mesh elements can result in inaccurate simulation. Too many mesh elements prolongs simulation processing during the mesh creation or simulation stages. Additionally, with the traditional meshing approach, the mesh can contain elements having faces which cross layer boundaries. Inaccurate simulations can result from these faces crossing layer boundaries as each layer of additive manufacturing should include self-contained faces.

SUMMARY

In one aspect, a layered volume mesh of a physical object to be created by an additive manufacturing process is generated by identifying a plurality of virtual layer planes slicing across a surface mesh representing the physical object. The surface mesh includes a plurality of nodes. The surface mesh is modified by projecting a subset of the plurality of nodes to the plurality of virtual planes. One of the subset of the plurality of nodes is within a predetermined distance from an intersection between the surface mesh and one of the virtual layer planes. The one node is moved onto the one virtual layer plane. Volume meshing of the modified surface mesh is performed to generate the layered volume mesh.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a single button, automatic meshing tool that generates a layered volume mesh conforming to the geometry of a modeled physical object. Use of the subject matter described herein eliminates the use of manual software tools and minimizes the amount of user input to generate a simulation quality mesh.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

Figure 1A:
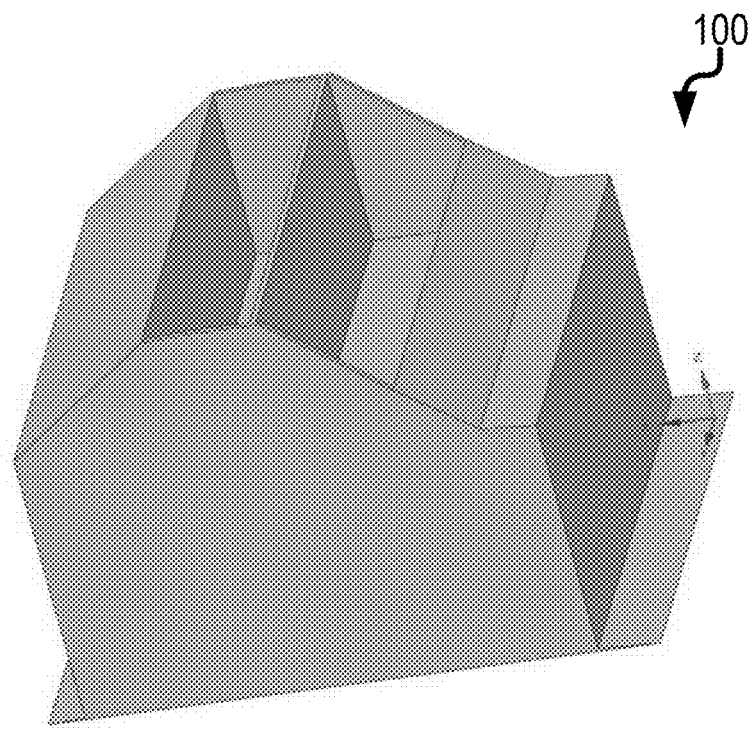
FIG. 1A illustrates an example CAD model of a physical, real world object.

Object simulations using modeling, such as CAD modeling, can inform users of various physical responses of objects when subjected to real world conditions such as stress or other mechanical forces. Physical, real world objects can be modeled with a CAD model. A physical replica of the CAD-modeled object can be made using additive manufacturing or 3D printing. With 3D printing, a 3D object can be fabricated through the deposition of successive layers of material. A layered volume mesh representing the layers of the CAD model can be used to simulate such fabrication. Such simulation using the volume mesh of a CAD model, having conformal layers (e.g., single interface shared between layers) with cells self-contained within each layer, facilitates improved additive manufacturing. The subject matter described herein generates a layered volume mesh of a physical, real world object from a surface mesh representation. The subject matter described herein slices the surface mesh to create layered surface mesh and fills the layered surface mesh layers with cells to create layered volume mesh.

A 3D physical object can be fabricated by depositing successive layers of material by an additive manufacturing process. Systems and methods are provided to generate layered volume mesh representing the layers of physical object. A plurality of virtual layer planes mathematically representing bottom and top planes of the layers, are constructed or identified. A surface mesh representing the physical object surfaces (e.g., a two-dimensional area that may or may not have a curvature), includes a plurality of nodes. Surface mesh imperfections around virtual layer planes are corrected, by projecting plurality of nodes of the imperfections, onto closest virtual layer plane (e.g., transforming points in n-space to m-space, where m is less than n, the projection of a point to a plane, as an example, may correspond to a closest point on the plane from the point). Surface mesh imperfection may correspond to one or more elements (e.g. node, face, edges etc.) of a mesh that satisfy one or more conditions related to spatial relations between the elements and/or with respect to a virtual layer plane. A virtual layer plane may be represented as mathematical representation of a two dimensional surface. Modified surface mesh is intersected with the plurality of virtual layer planes. Series of surface mesh nodes created by the intersection are collected and triangulated (e.g., generate a set of triangles to cover a surface partly or totally) to create layer interfaces (e.g., interface between the layers). Layer interfaces overlapping with surface mesh or outside surface mesh domain are identified and deleted. A layered surface mesh formed by surface mesh and layer interfaces is optimized or updated using various surface mesh quality improve algorithms. Surface mesh surfaces proximal to layer interfaces, remaining after node projection and/or created by surface mesh optimization are identified. The identified surface mesh proximal surfaces are corrected, by moving plurality of nodes of the proximal surfaces, to predetermined distance away from closest layer interface. A volume mesh is generated by filling layered surface mesh layers. The volume mesh is optimized or updated using volume mesh quality improve algorithms. The optimized volume mesh is validated for additive manufacturing simulations using virtual layer planes.

Figure 1B:
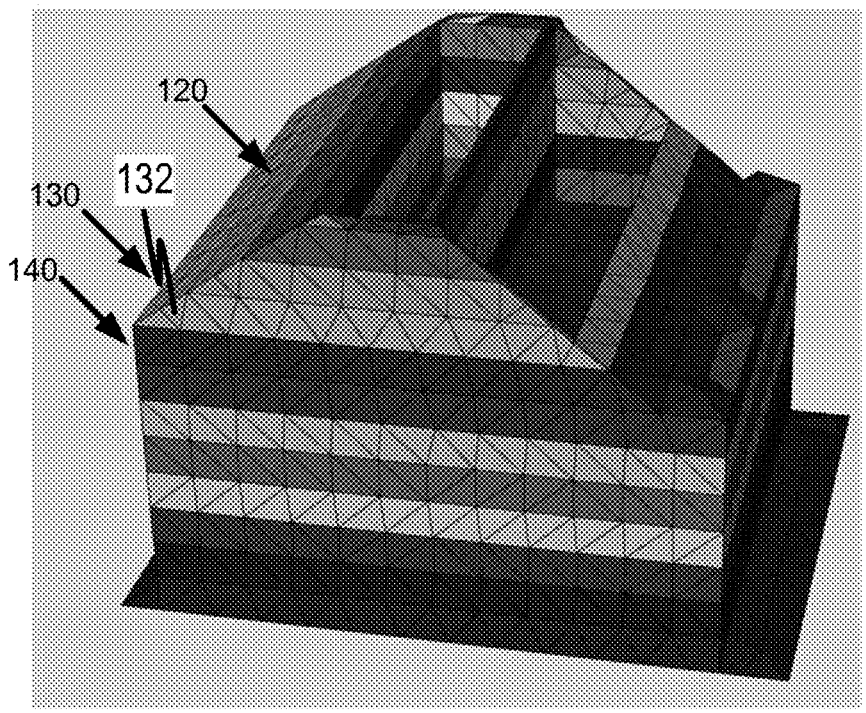
FIG. 1B illustrates an example layered volume mesh generated using the methods described herein.

FIG. 1A is an example CAD model 100 of a physical, real world object. FIG. 1B is an example layered volume mesh 110 generated using the methods described herein. Layered volume mesh 110 includes a plurality of layers (e.g., 120, 130, 140). Each layer includes a plurality of tetrahedrons (e.g., a solid having four triangular faces such as tetrahedron 132 of layer 130).

Figure 2:
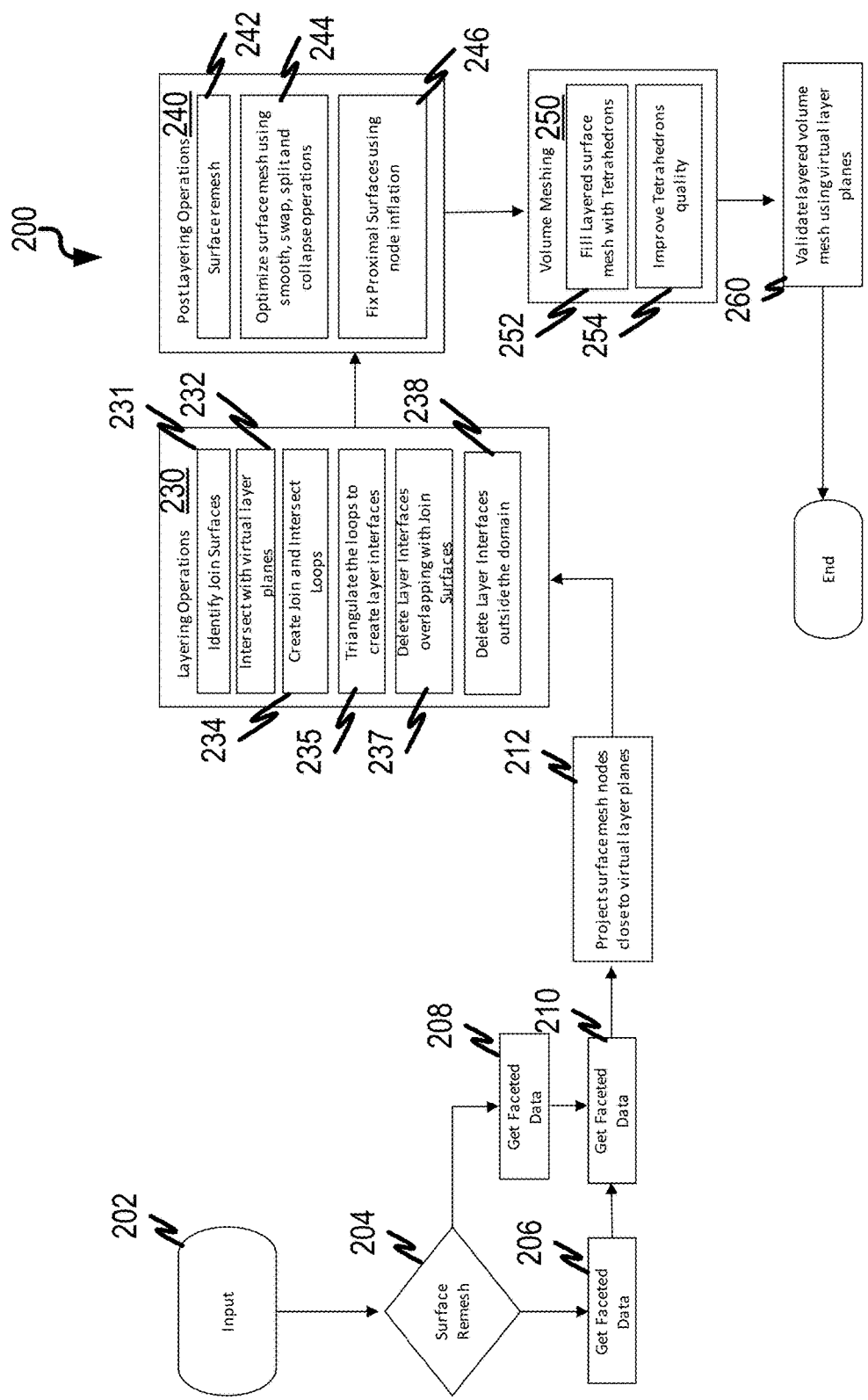
FIG. 2 illustrates an example process flow diagram for generating a layered volume mesh of a physical object to be created by an additive manufacturing process.

FIG. 2 illustrates an example process flow diagram for generating a layered volume mesh of a physical object to be created by an additive manufacturing process. A layered volume mesh, such as volume mesh 110 of FIG. 1B is generated using an input CAD model, such as CAD model 100 of FIG. 1A, at the end of the process. Software can check the input CAD model to determine, at 204, whether surface re-meshing is required. Surface re-meshing may be required, for example, if the input CAD model has no associated mesh (e.g., a discrete representation of a geometry of individual region of the physical, real world object having a number of triangles and vertices), but is rather just a 3D object representation. If it is determined that surface re-meshing is required, then a surface mesh is generated, at 206, as described in FIG. 3. If surface re-meshing is not required, then the faceted data (e.g., two-dimensional triangle representations that together make up the CAD model) is retrieved, at 208. Virtual layer planes are constructed, at 210, as described in more detail in FIG. 4.

Surface mesh imperfections around virtual layer planes can exist in a surface mesh that can lead to failures during layering, volume meshing or tetrahedron quality issues. For examples, layering or mesh failures can occur when edges of the surface mesh closely, parallel, and/or cross the virtual layer planes. Node projection at 212, can be performed to remedy layering failures, to a surface mesh. With node projection, surface mesh nodes (e.g., points along edge of the mesh representation) can be projected (e.g., the nodes within the predetermined threshold range from the virtual layer planes are moved onto the virtual layer planes) as described in more detail in FIGS. 5B, 6B, and 7B.

A number of different layering operations 230 are performed to the surface mesh after node projection. These layering operations 230 can include, but are not limited to, identifying join surfaces 231 (e.g., surface with having all nodes within the virtual layer plane). The identification of join surfaces are described in more detail in FIG. 8. Join and intersect loops can be created, at 234, as described in more detail in FIGS. 9-10. A join loop is created by a series of outer nodes of join surface. Surface mesh is intersected with virtual layer planes as described in more detail in FIG. 10. An intersect loop is created by a set of nodes (e.g., a number of nodes) of surface mesh faces (e.g., one-dimensional side of a two-dimensional surface) with only two nodes on virtual layer planes after the surface mesh intersection with virtual layer planes. By triangulating the intersect loops and the join loops corresponding to the same virtual layer plane together, at 235, layer interfaces are created. Further details on the join and intersect loop triangulation described in FIG. 13. With triangulation, additional surfaces of layer interface that overlap with join surfaces are identified using join loops. In order to remedy potential mesh failures that can be caused by overlapping surfaces, one of the overlapping surface is deleted, at 237, as described in more detail in FIGS. 14-15. Additionally, additional surfaces of layer interfaces created outside of the surface mesh domain are deleted, at 238, as described in more detail in FIGS. 16-18.

Additional post-layering operations 240 can be performed to further improve a mesh such as additional surface re-meshing 242, improvement of face quality 244, and/or fixing overlapping and proximal faces (e.g., faces having a gap less than predetermined tolerance between each other) using node inflation 246. Node inflation is performed by moving nodes of the input which are close and proximal to layer interfaces away from these layer interfaces as described in more detail in FIGS. 5B, 6B, and 7B.

Volume meshing 250, at 252, is used to fill the layered surface mesh with tetrahedrons. Volume meshing 250, at 254, identifies tetrahedrons with quality that is worse than a quality of the simulation mesh quality and then tries to improve such quality of the tetrahedrons. The layered volume mesh such as the one described in FIG. 1B can be validated, at 260, by identifying tetrahedrons elements spanning across layer planes as well as identifying layers having missing tetrahedrons elements.

Figure 3:
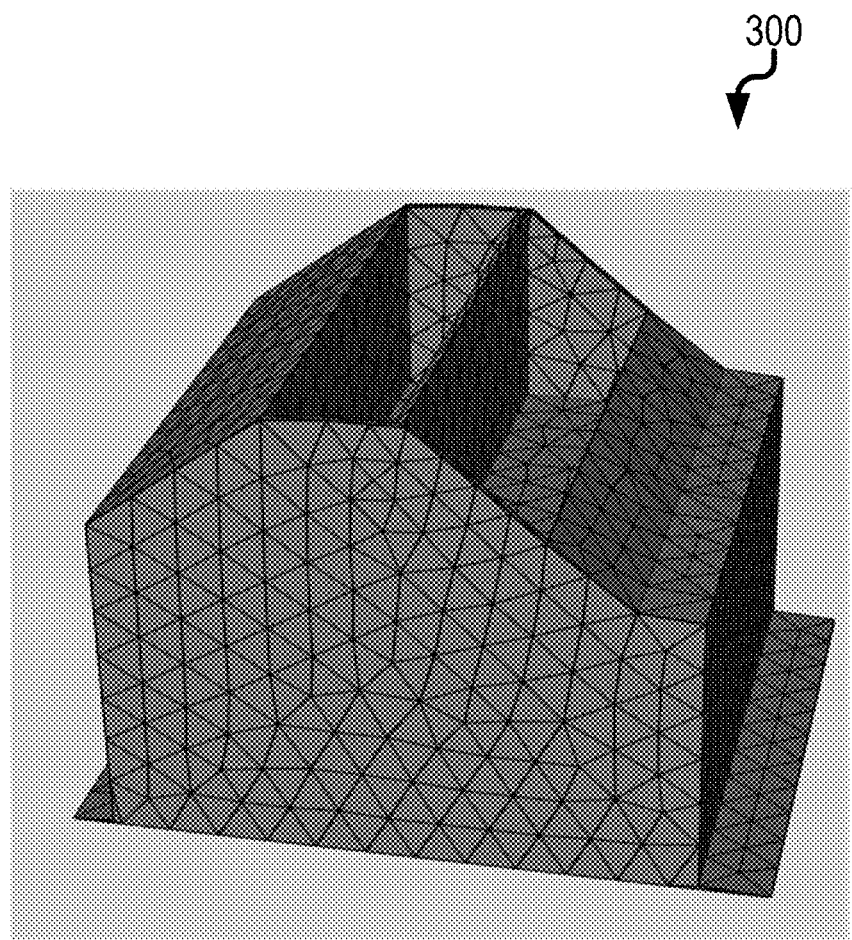
FIG. 3 illustrates an example surface mesh of the physical world object of FIG. 1.

The example CAD model 100 of FIG. 1A can be represented by a surface mesh (e.g., a discrete representation of a geometry having triangular faces and vertices), such as the surface mesh 300 illustrated in FIG. 3. Surface mesh 300 can be generated using any suitable surface mesh generating algorithm.

Figure 4:
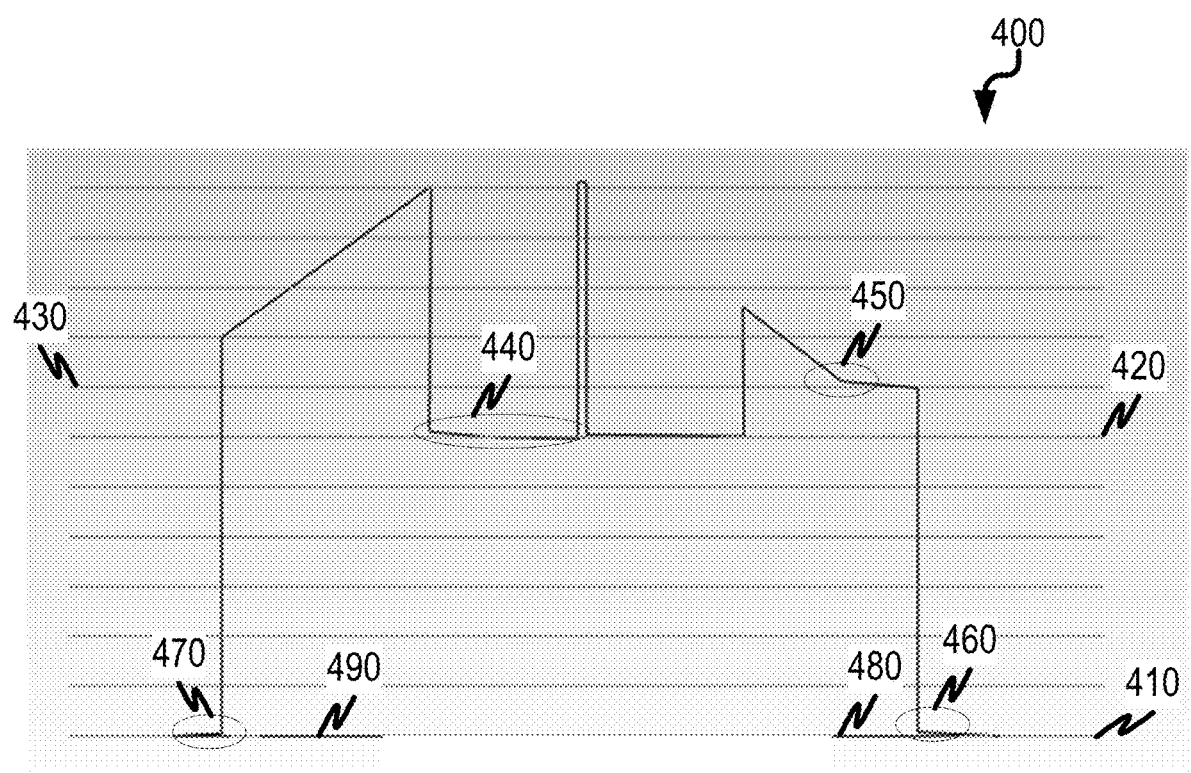
FIG. 4 illustrates a two-dimensional view of an example surface mesh.

FIG. 4 is an example two-dimensional (2D) view of a surface mesh 400 having virtual layer planes overlaid (e.g., surface mesh 300 with virtual layer planes 410, 420, 430). The 2D view represents the cross-sectional plane when the y-axis, as defined in FIG. 1A, is equal to zero. It should be understood that the mesh surfaces and virtual layer planes are shown as a lines in the images of two-dimensional view, example FIG. 4. These surfaces and virtual layer planes in 2D view are referred as line segments. The surface mesh 300 is divided into a number of virtual layer planes (e.g., virtual layer planes 410, 420, 430). Virtual layer planes 410, 430 are layer planes created by defining a mathematical formula rather than using an actual surface defined by triangle facets (e.g., 2 dimensional triangle with three nodes). For example, each virtual layer plane 410, 420, 430 can be defined by $$z=b+nh, \quad (1)$$

where z is the virtual layer plane, b is a base of the virtual layer plane, n is a current layer number, and h is a height of the layer. Using Equation (1) to define each virtual layer plane, no facets are required. As illustrated in FIG. 4, virtual layer planes 410, 420, 430 virtually slice the surface mesh 300 into a number of layers.

Figure 5A:
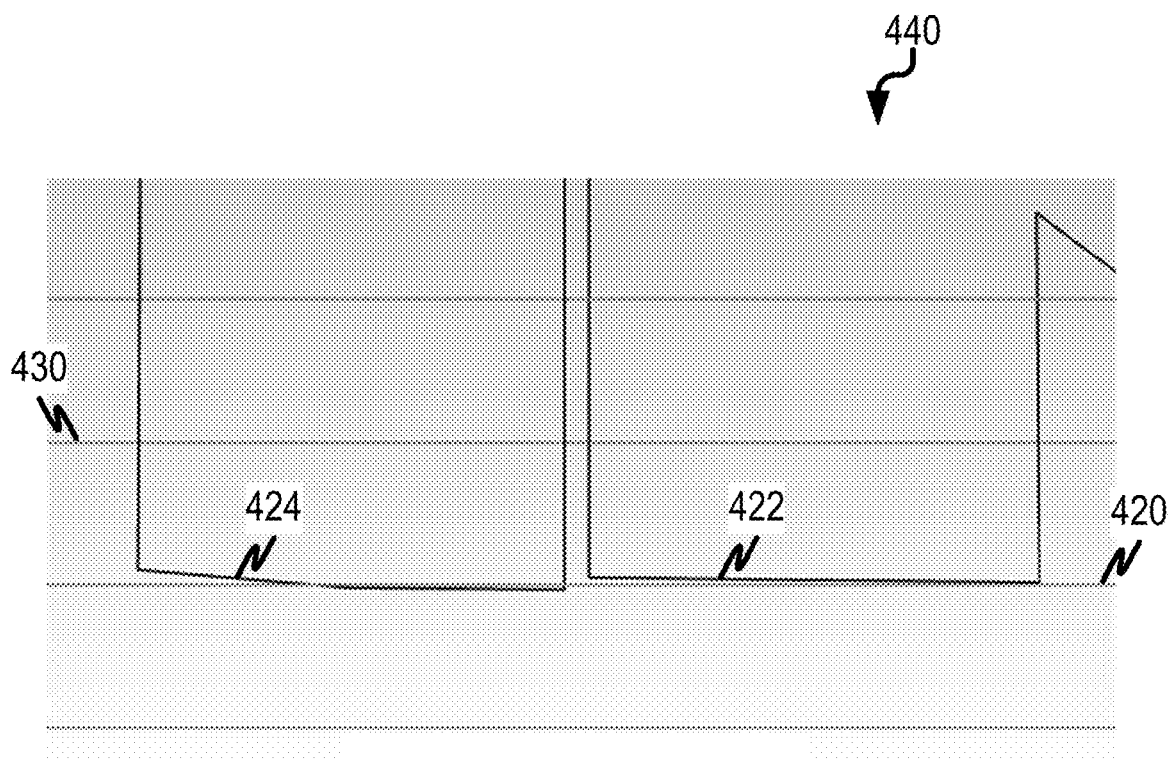
FIG. 5A illustrates a zoomed-in view of an example surface mesh imperfections around virtual layer planes.

Imperfections can exist within the surface mesh 400 which can lead to mesh failures during volume meshing or tetrahedron quality issues. Mesh failures can occur, for example, when surfaces of the mesh overlap or when element edges have intricate curvatures or acute angles (e.g., less than 30 degrees). For example, a surface mesh imperfections 440 around virtual layer planes can exist where there is a low acute angle between two surfaces (e.g., between line segment 480 and mesh imperfection 460 as well as between line segment 490 and mesh perfection 470), a zoomed in version of this surface mesh imperfections around virtual layer planes is illustrated in FIG. 5A. Line segments 480, 490 are aligned with virtual layer plane 410. As illustrated in FIG. 5A, line segment 422 of surface mesh 400 closely parallels virtual layer plane 420. Similarly, line segment 424 of surface mesh 400 crosses virtual layer plane 420 creating acute angles between line segment 424 and virtual layer plane 420.

Figure 6A:
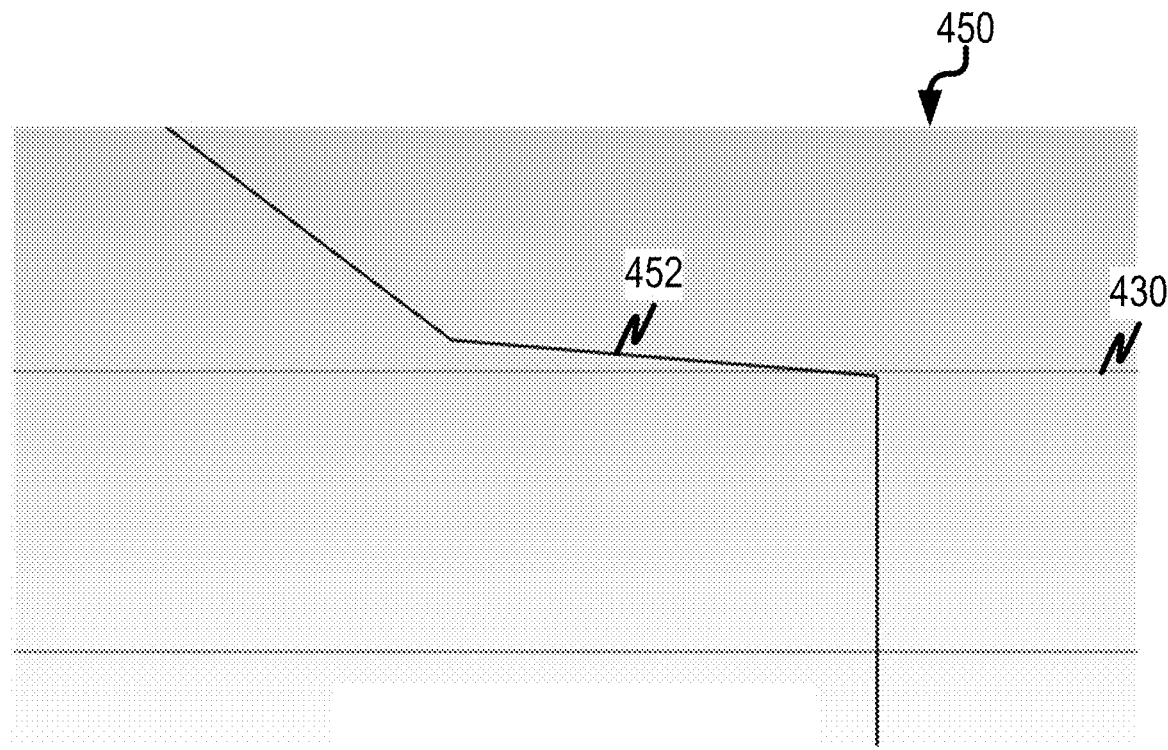
FIG. 6A illustrates a zoomed-in view of another example surface mesh imperfections around virtual layer planes.
Figure 7A:
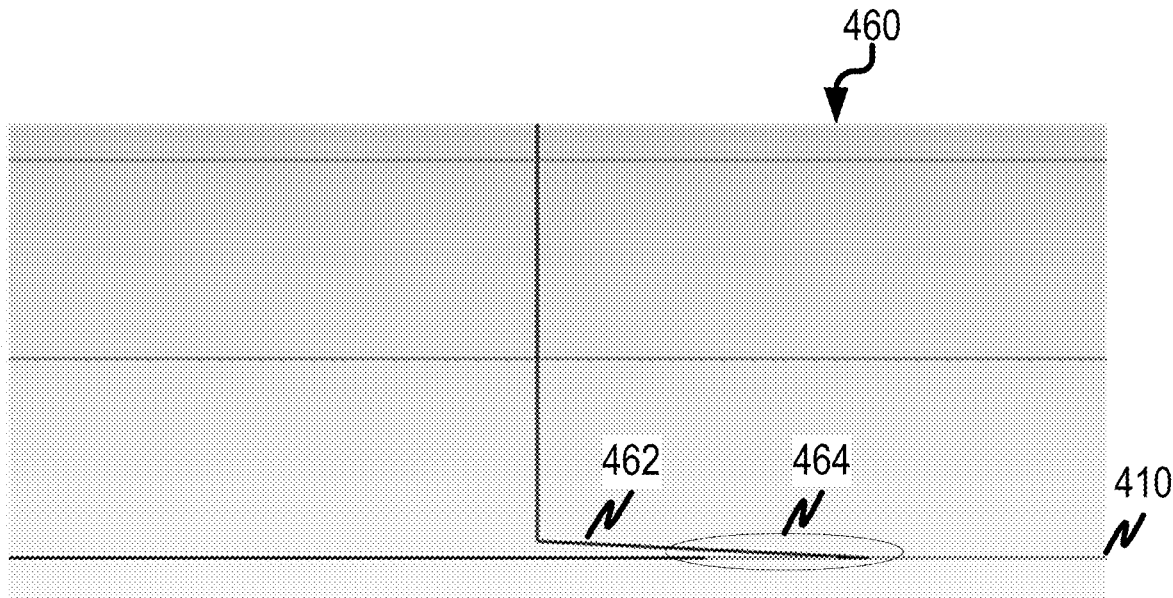
FIG. 7A illustrates a zoomed-in view of an example surface mesh imperfections around virtual layer planes.

Another surface mesh imperfection 450 around virtual layer planes exists, as illustrated in more detail in FIG. 6A, where line segment 452 of surface mesh 400 crosses virtual layer plane 430. Another example surface mesh imperfection 460 around virtual layer planes exists, as illustrated in more detail in FIG. 7A, where line segment 462 of surface mesh 400 creates an acute angle (e.g., sharp angle) between line segment 462 and virtual layer plane 410. More specifically, the acute angle occurs within a portion of line segment 462 (e.g., portion 464). Surface mesh imperfection 470 around virtual layer planes has similar characteristics as surface mesh imperfection 460 around virtual layer planes.

In order to identify imperfections within a surface mesh 300 (e.g., surface mesh imperfections 440, 450, 460, 470), nodes of the surface mesh 300 (e.g., points along a triangular element of the mesh) which are too close to the virtual layer planes are identified. For example, nodes may be too close if the distance between the node and the virtual layer plane is within a given projection threshold (e.g., a predetermined distance from one of the virtual layer planes). The identified nodes can be projected onto the virtual layer planes. In other words, the nodes can be moved to a different location so as to be on the virtual layer plane, rather than close to it, to avoid slicing failures. The faces with all three nodes on virtual layer planes can be treated as join surfaces.

Figure 5B:
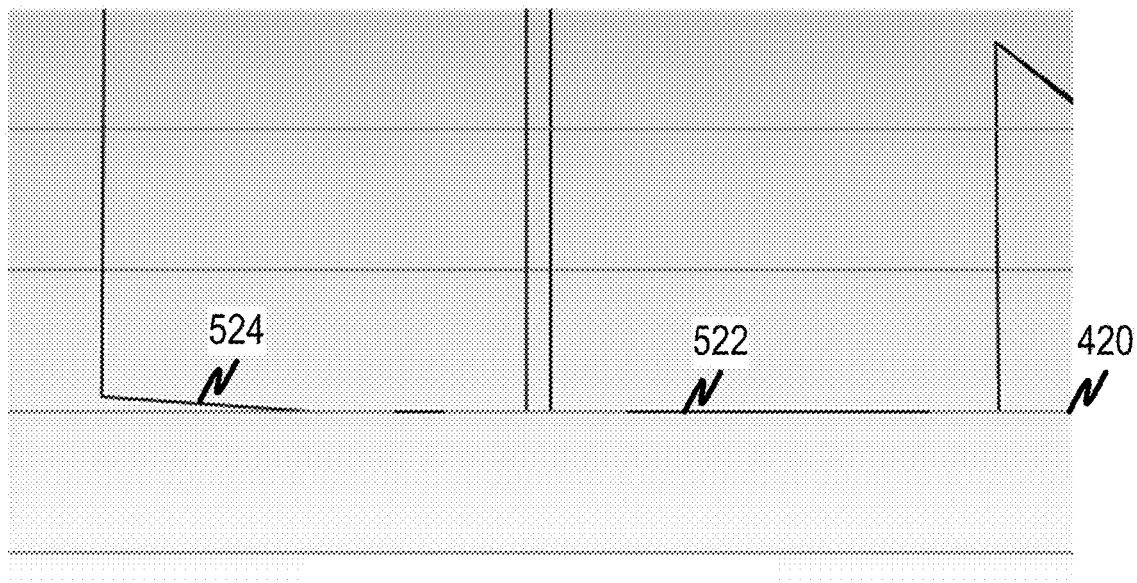
FIG. 5B illustrates a zoomed-in view of an example surface mesh imperfections around virtual layer planes after node perfection.

FIG. 5B illustrates example line segments 522, 524 after node projection is performed on line segments 422, 424, respectively of FIG. 5A. As illustrated in FIG. 5B, line segment 522 is flush with virtual layer plane 420. In other words, the gap existing between line segment 422 and virtual layer plane 420 has been eliminated after projection of the nodes of line segment 422.

Figure 6B:
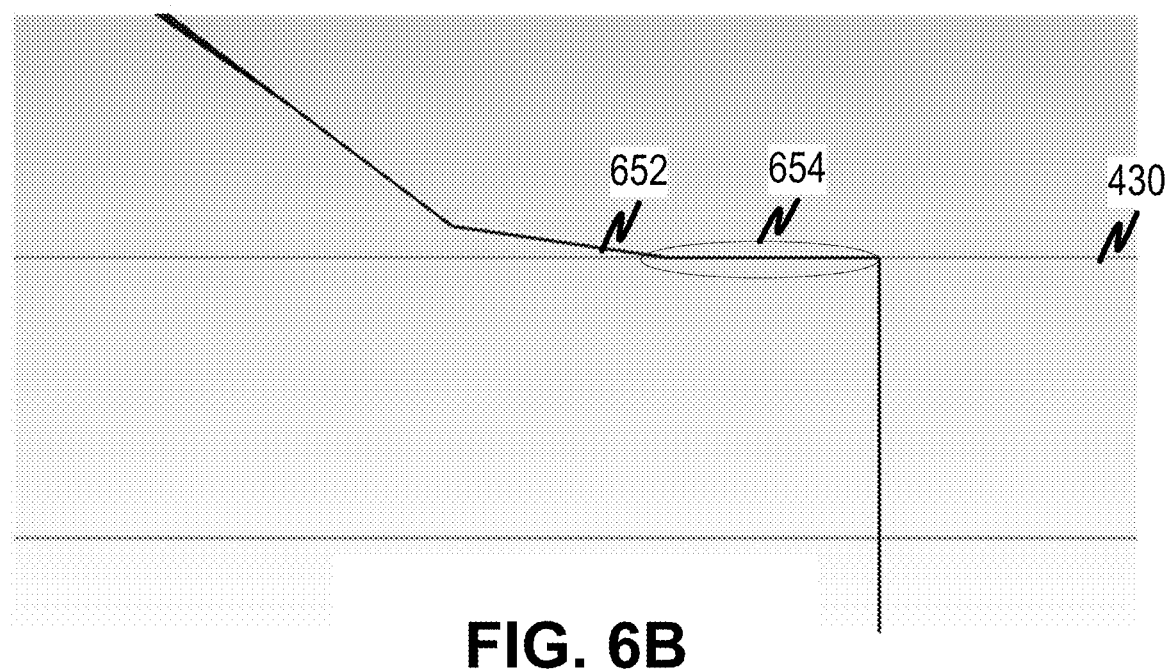
FIG. 6B illustrates a zoomed-in view of another example surface mesh imperfections around virtual layer planes after node perfection.

FIG. 6B illustrates an example line segment 652 after node projection is performed on line segment 452 of FIG. 6A. As illustrated in FIG. 6B, a portion of line segment 652 (e.g., portion 654) is aligned with virtual layer plane 430 after the node projection, rather than crossing virtual layer plane 430 as occurred in FIG. 6A.

Figure 7B:
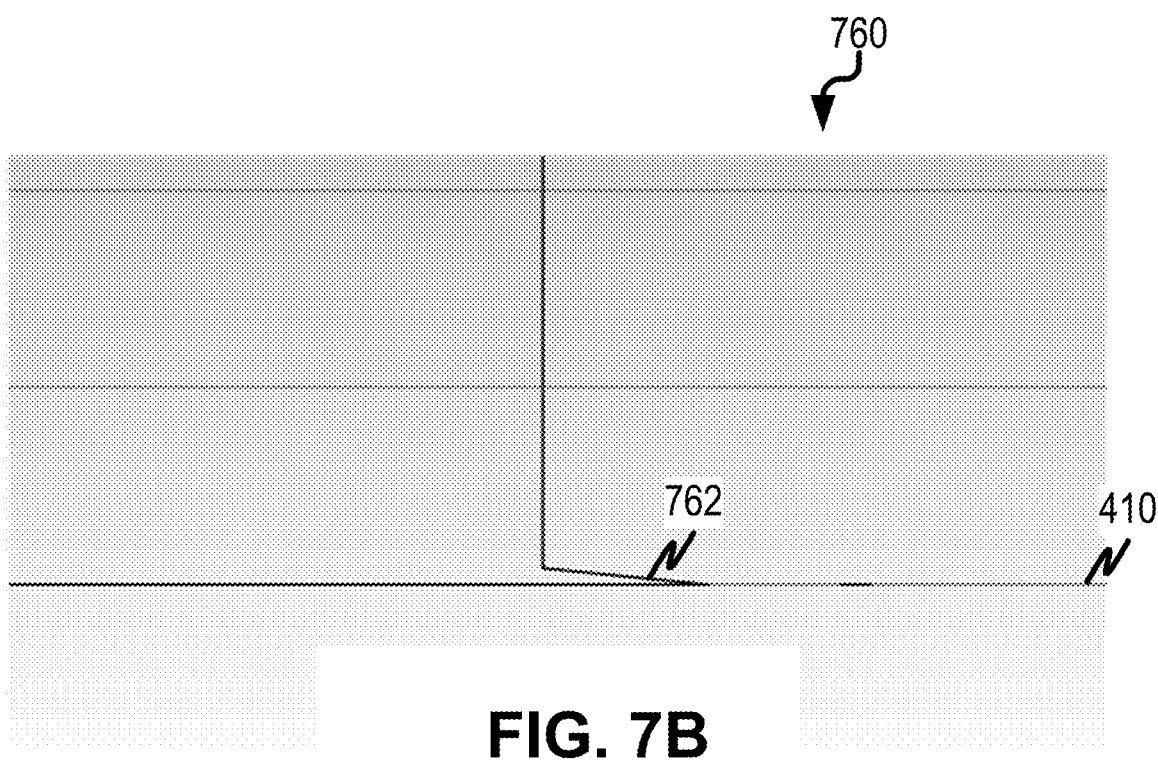
FIG. 7B illustrates a zoomed-in view of an example surface mesh imperfections around virtual layer planes after node perfection and before reverting projected nodes back to fix overlappings within surface mesh created by the node projection.
Figure 20A:
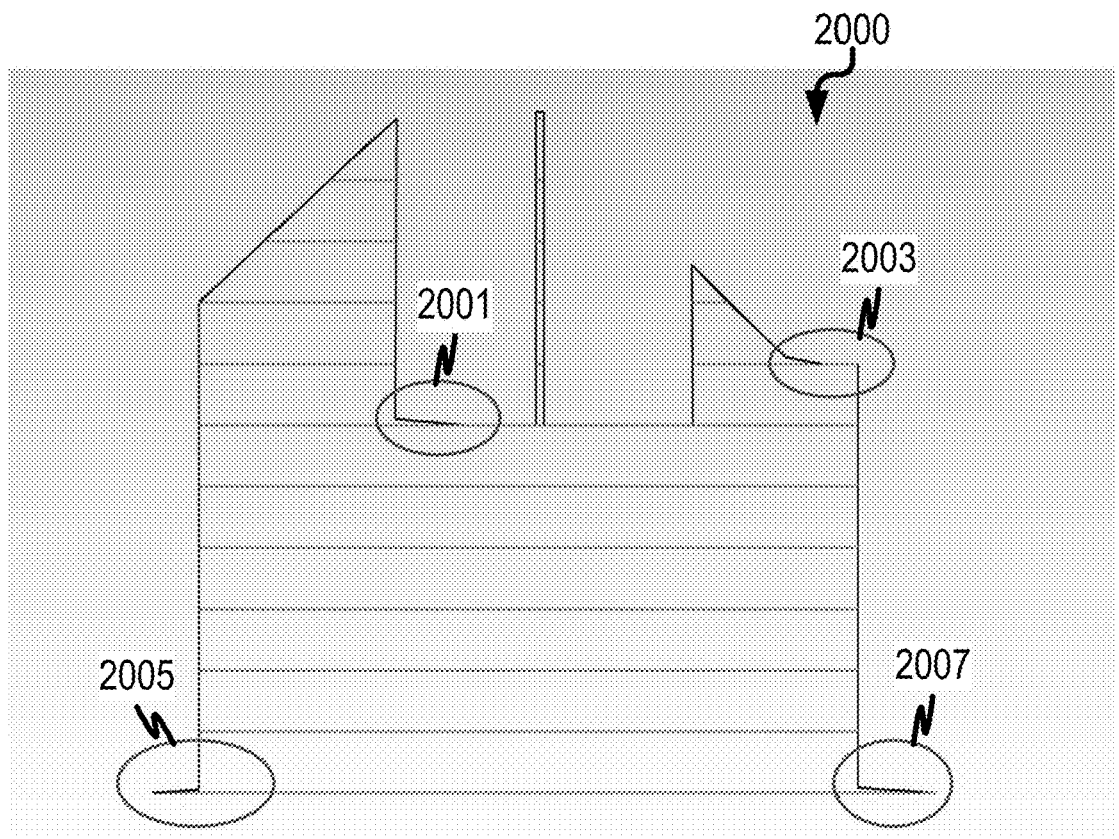
FIG. 20A illustrates an example surface mesh having a number of surface mesh proximal surfaces.
Figure 20B:
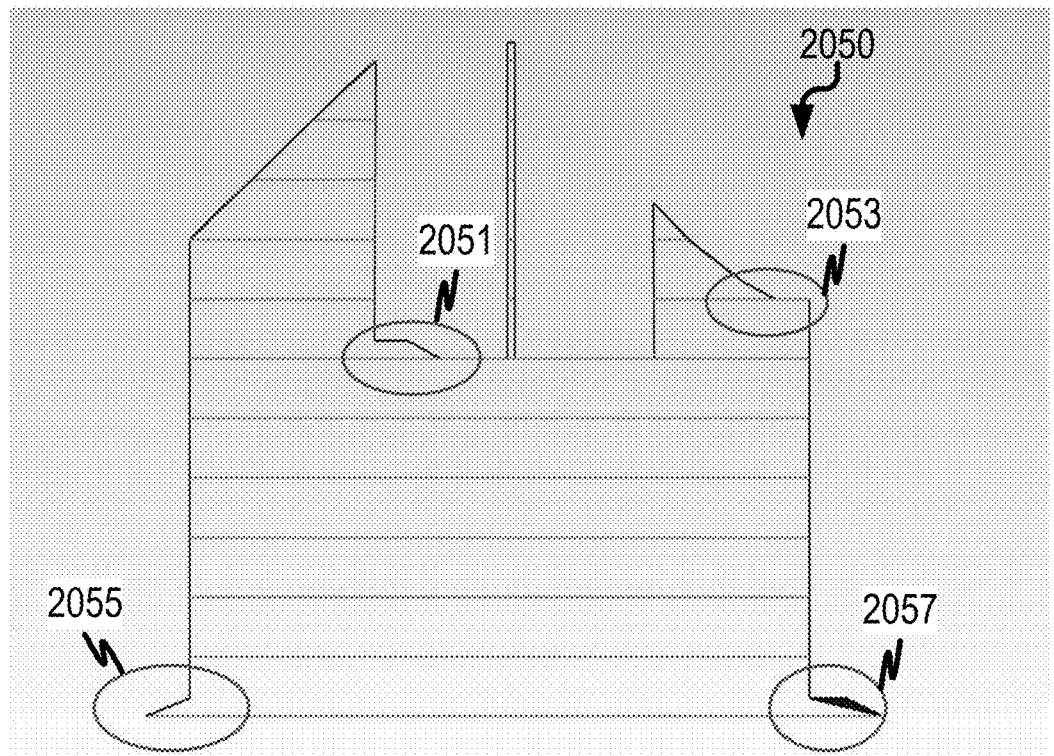
FIG. 20B illustrates a corrected surface mesh having proximal surfaces of the surface mesh of FIG. 20A.

FIG. 7B illustrates a zoomed-in view of an example surface mesh imperfections around virtual layer planes after node perfection and before reverting projected nodes back to fix overlapping within surface mesh created by the node projection. As illustrated in FIG. 7B by line segment 762, after node projection, portion 464 of line segment 462 is completely overlapping with surface mesh line 480, which will lead into slicing failures as there are two surface mesh segments overlapping the virtual layer plane. These areas are identified and the projected nodes are moved back to the original position before projection as described in more detail in FIG. 8. Such surface mesh imperfections cannot be corrected by projection and will be addressed using one node inflation operation as illustrated in FIG. 20A-B.

Figure 8:
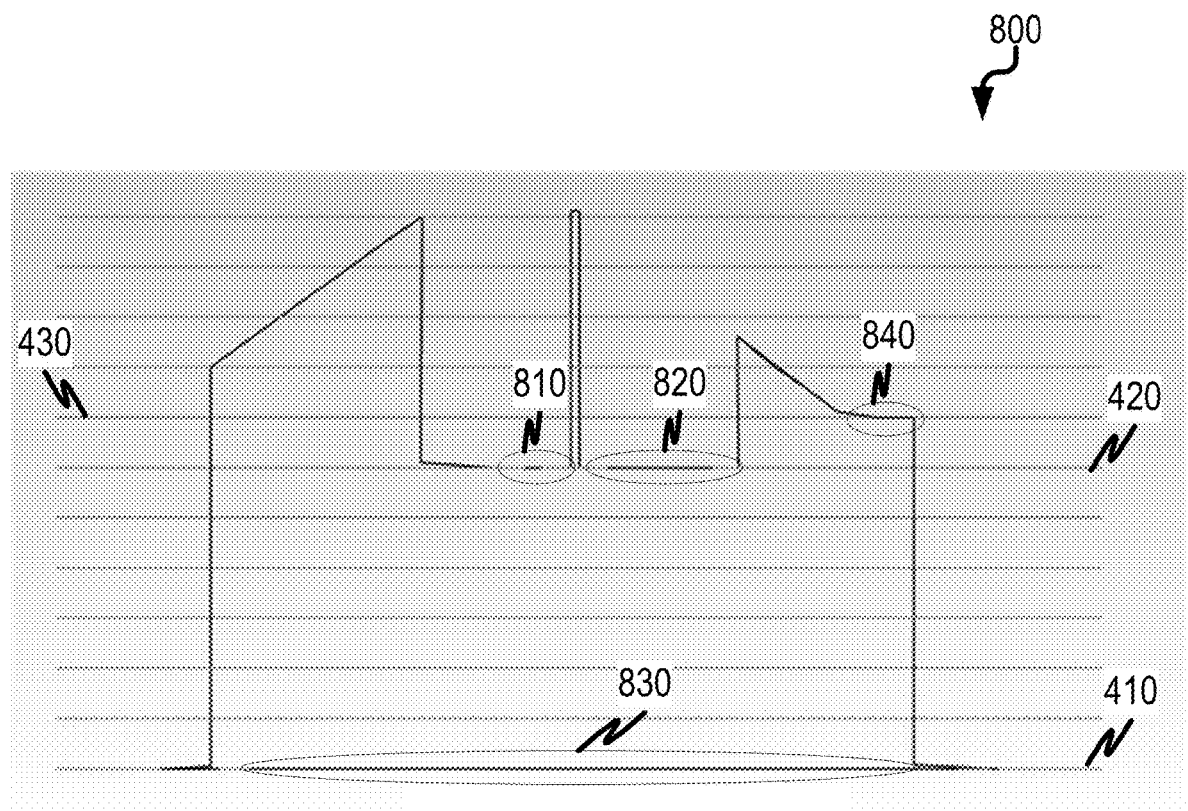
FIG. 8 illustrates an example surface mesh after node projection.

FIG. 8 illustrates an example surface mesh 800 after node projection (e.g., surface mesh 400 after node projection). As illustrated in FIG. 8, join surfaces occur for faces which have all corresponding nodes within a virtual layer plane. For example, join surfaces 810, 820 have all corresponding nodes within virtual layer plane 420. Similarly, join surface 830 has all corresponding nodes within virtual layer plane 410. Join surface 840 has all corresponding nodes within virtual layer plane 430. These surfaces are identified and marked as join surfaces and join loops and are extracted using a series of outer nodes of the join surfaces.

Figure 9:
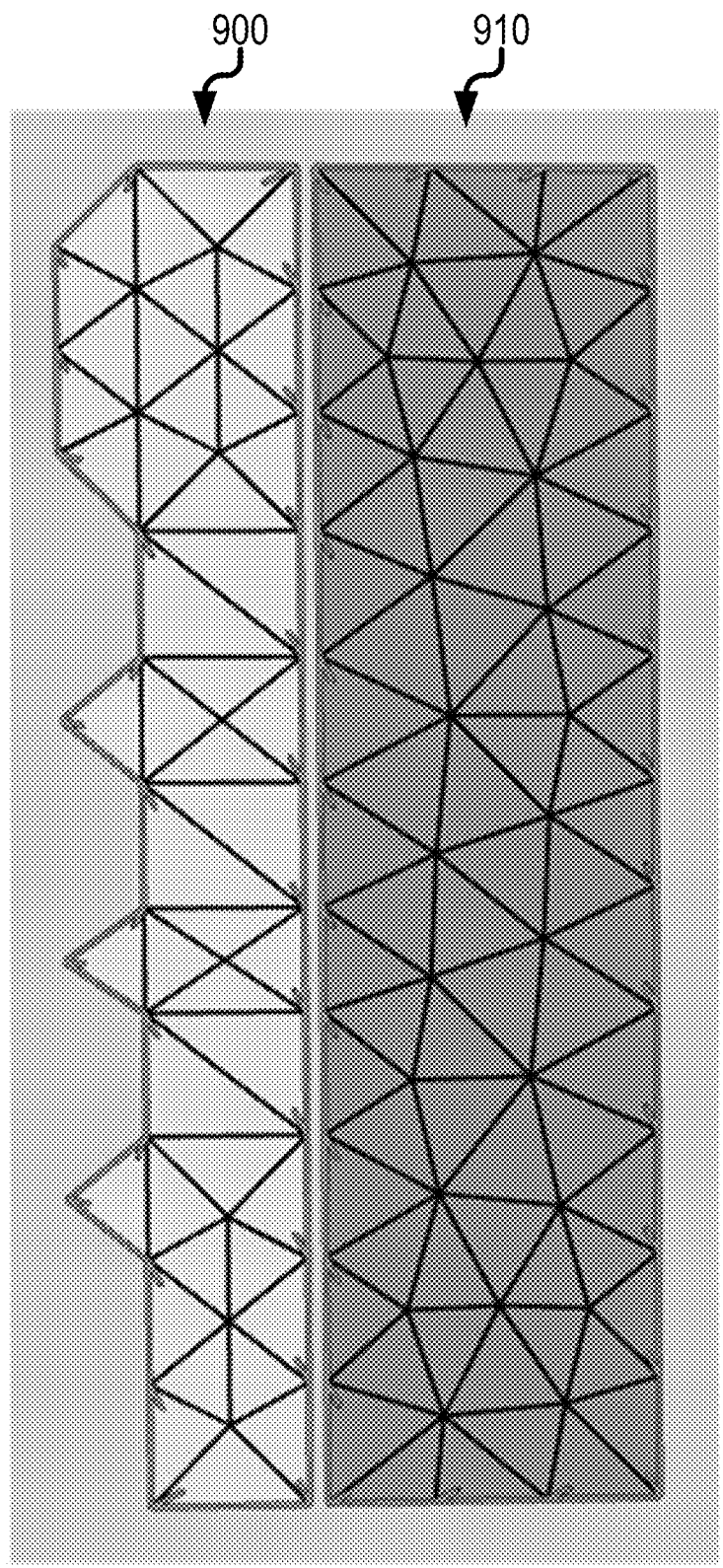
FIG. 9 illustrates example join surfaces (i.e., surfaces overlapping with virtual layer planes) of an example surface mesh.

FIG. 9 illustrates 3D view of example join surfaces 900, 910 (i.e., 3D view of join surfaces 810, 820 respectively of surface mesh 800 in FIG. 8.) along with join loops extracted using outer nodes of join surfaces. In other words join loop is 2d line representation of join surface. A join loop is a loop defined by a set of nodes within a mesh (e.g., a subset of nodes of the mesh). Defining a join loop helps in identifying layer interfaces created for virtual layer plane where there already a join surface from surface mesh representing portion of virtual layer plane and delete layer interface version of surface to avoid overlapping surfaces.

Figure 10:
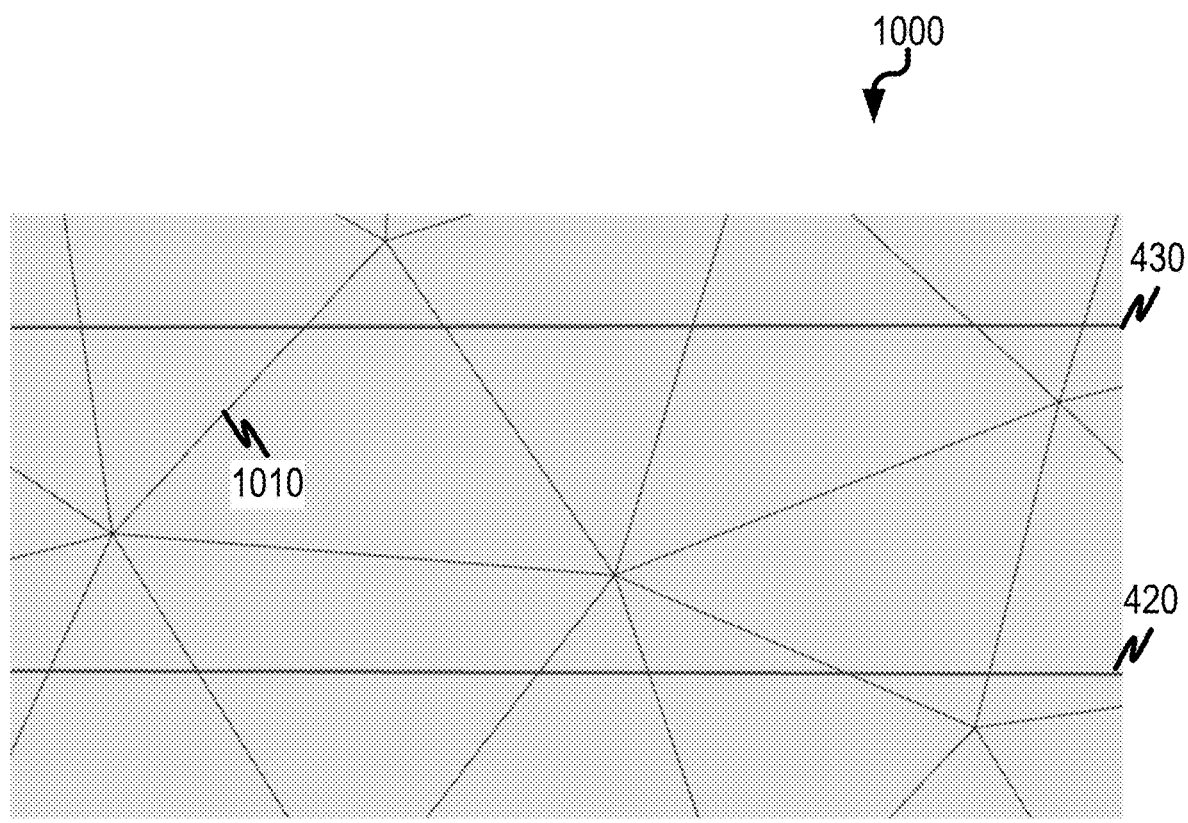
FIG. 10 illustrates a 3D view of a portion of an example surface mesh prior to intersection with virtual layer planes.

FIG. 10 illustrates a 3D view of a portion of an example surface mesh 400 prior to intersection with virtual layer planes. The surface mesh with face side (e.g., pair nodes representing side of triangle face) intersecting a virtual layer plane (i.e., one node above and another node below virtual layer plane) are identified. A face is a flat or planar, one-dimensional area that forms a boundary of a solid object. For example face edge 1010 intersecting virtual layer plane 430. The face is split at intersection point with virtual layer plane by creating new node at the intersection point as described in more detail in FIG. 11. The face split is performed one by one for all the face sides interesting any virtual layer plane until there are no face side remain intersecting any virtual layer plane.

Figure 11:
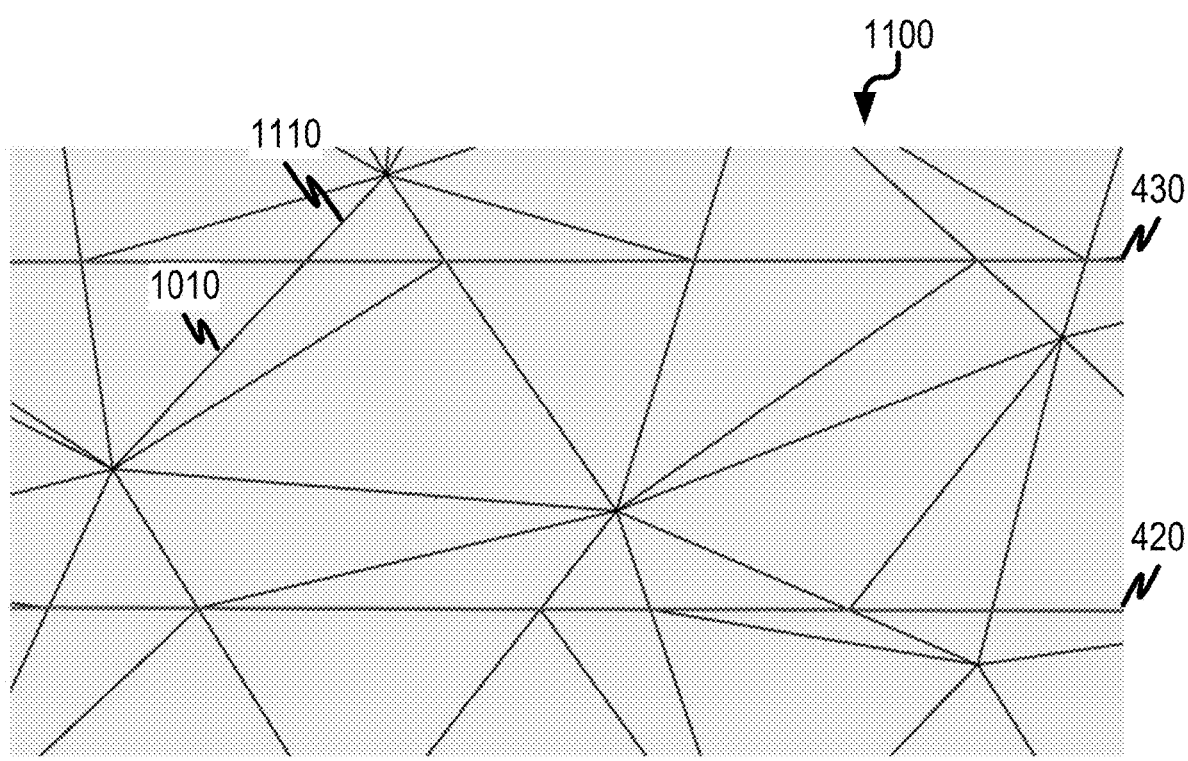
FIG. 11 illustrates a 3D view of a portion of the surface mesh after intersection with virtual layer planes.

FIG. 11 illustrates a 3D view of a portion of an example surface mesh 400 after intersection with virtual layer planes. Face edges which intersect a virtual plane (e.g., virtual plane 420, 430) can be identified such as face edge 1010. Those face edges can be split at the virtual layer planes. For example, face edge 1010 is split into face edges 1010, 1110 as illustrated in FIG. 11. Face edges 1010 and 1110 are split by virtual layer plane 430 such that faces of 1010 are sliced with virtual layer plane 430. The face split is performed one by one for all the face sides interesting any virtual layer plane until there are no face side remain intersecting any virtual layer plane. All the surface mesh nodes (e.g., including the new nodes created by split) on virtual layer plane and not part of join loop are identified as intersect nodes. An intersect loop for each virtual layer plane is created using series of the identified nodes.

Figure 12:
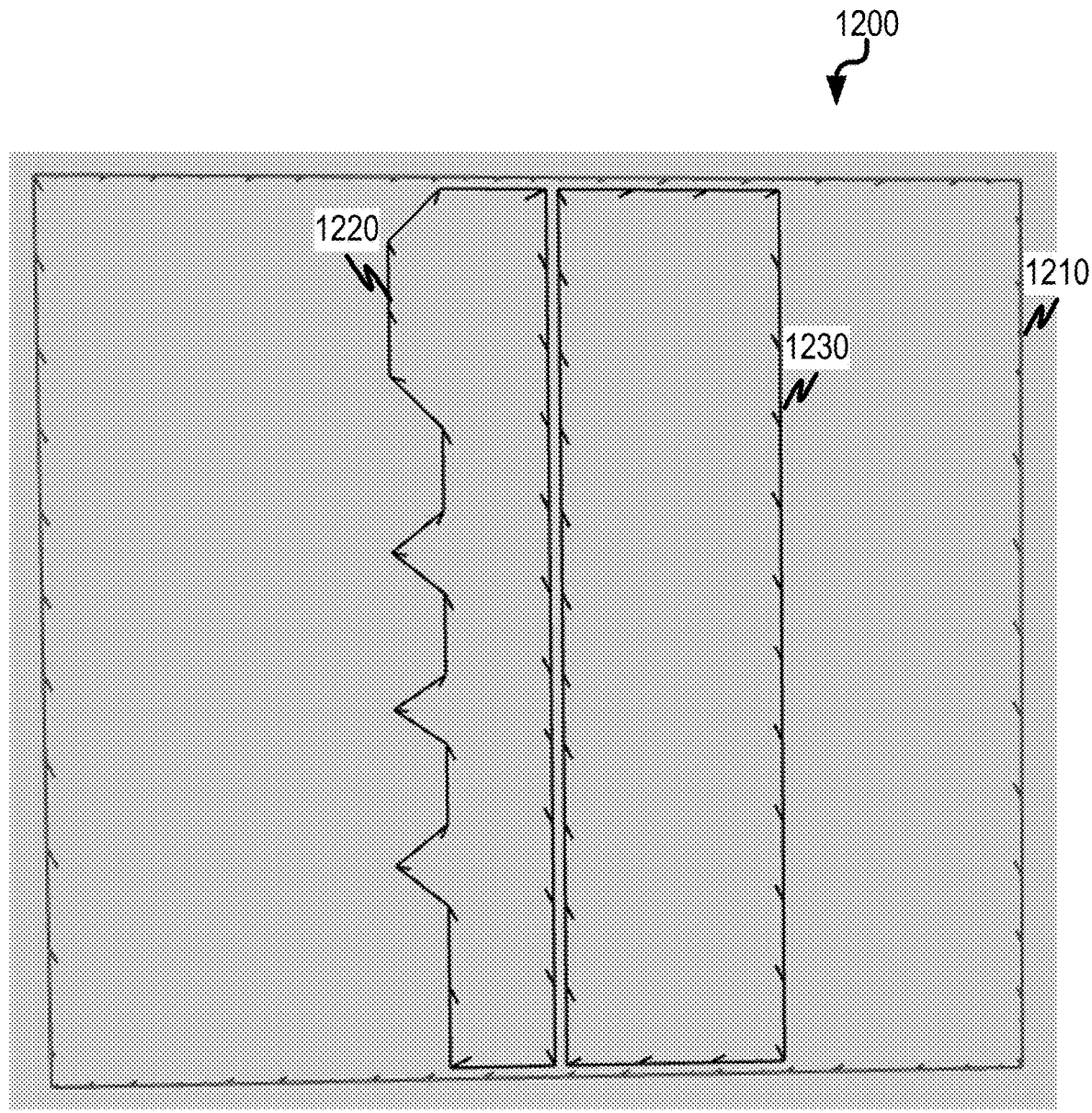
FIG. 12 is an example layer plane having both join loops and intersect loops created using series of nodes on virtual layer planes.

FIG. 12 is an example virtual layer plane 1200 having both join loops 1220, 1230 and intersect loops 1210 created using series of nodes on the virtual layer plane. Combining both join loops 1220 (i.e., join loop of join surface 900), 1230 (i.e., join loop of join surface 910) and intersect loop 1210 of virtual layer plane 420 together forms edge loops required to create layer interface for virtual layer plane 420. Join loops 1220, 1230 and intersect loop 1210 are triangulated to create a layer interface for virtual layer plane 420.

Figure 13:
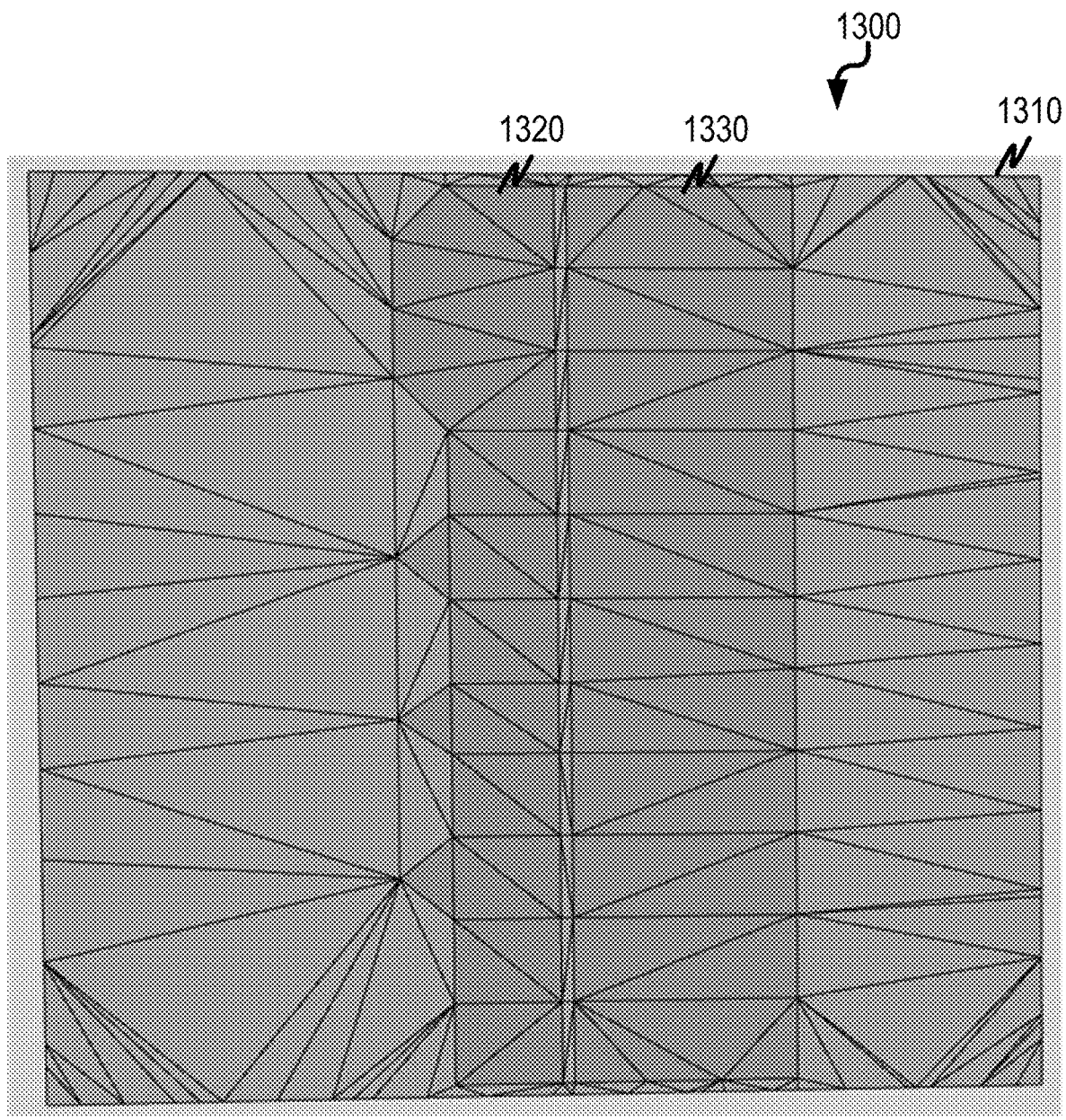
FIG. 13 illustrates an example layer interface created by triangulating join loops and intersect loops created using series of nodes on virtual layer planes.
Figure 14:
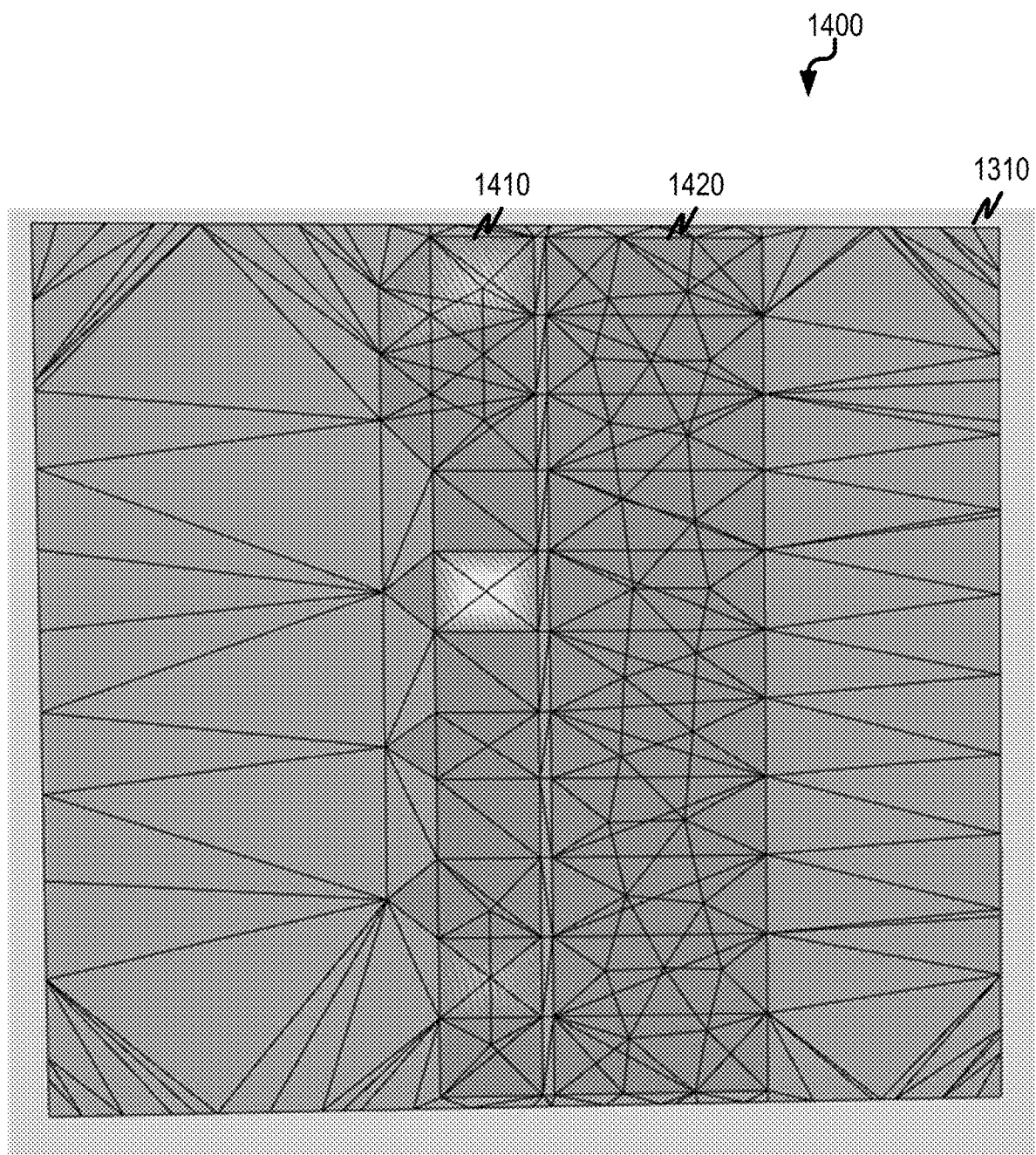
FIG. 14 illustrates an example layer interface having overlapping surface mesh (i.e., join surfaces).
Figure 15:
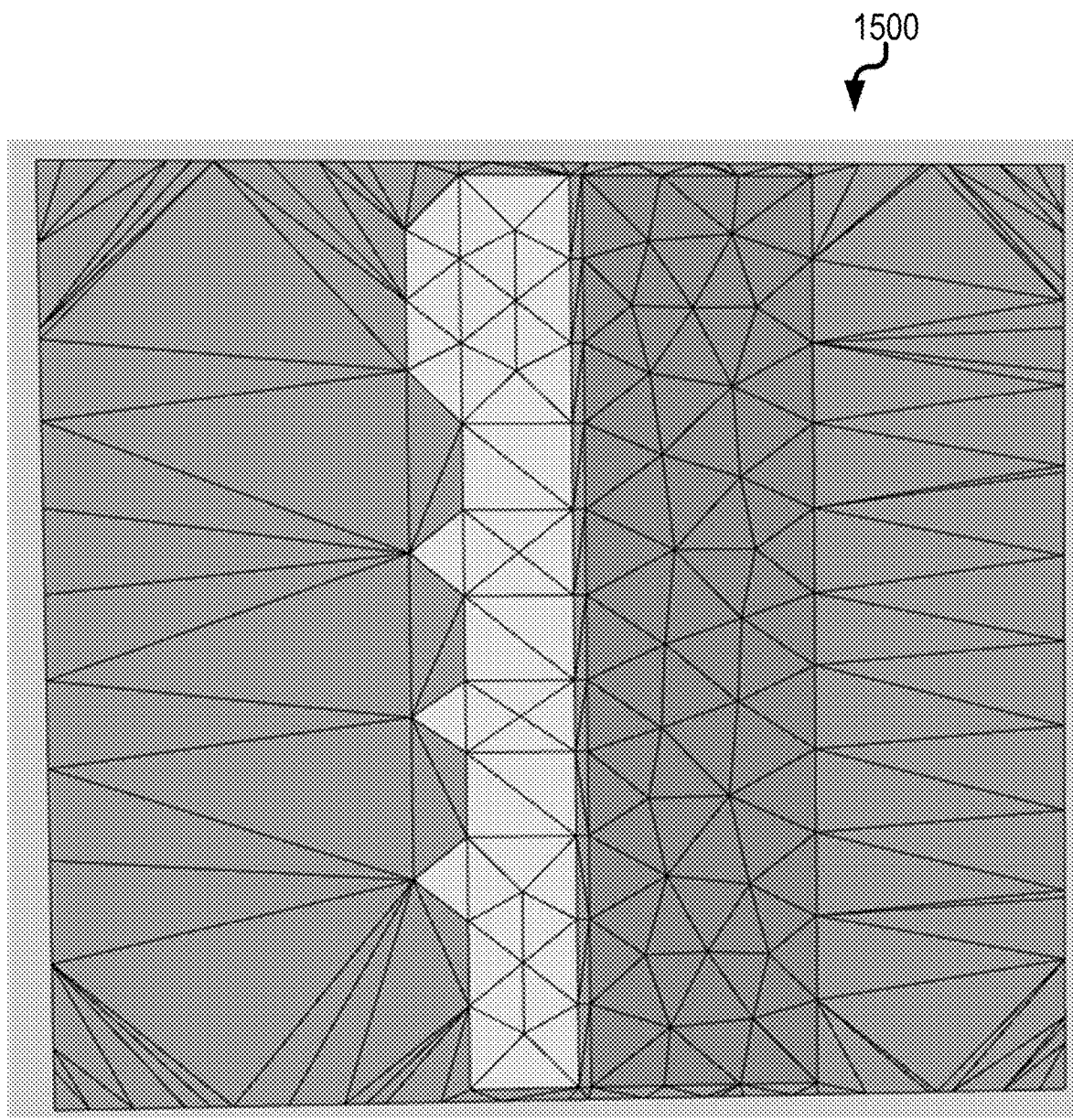
FIG. 15 illustrates an example layer interface having the overlapping surfaces corrected by deletion.
Figure 16:
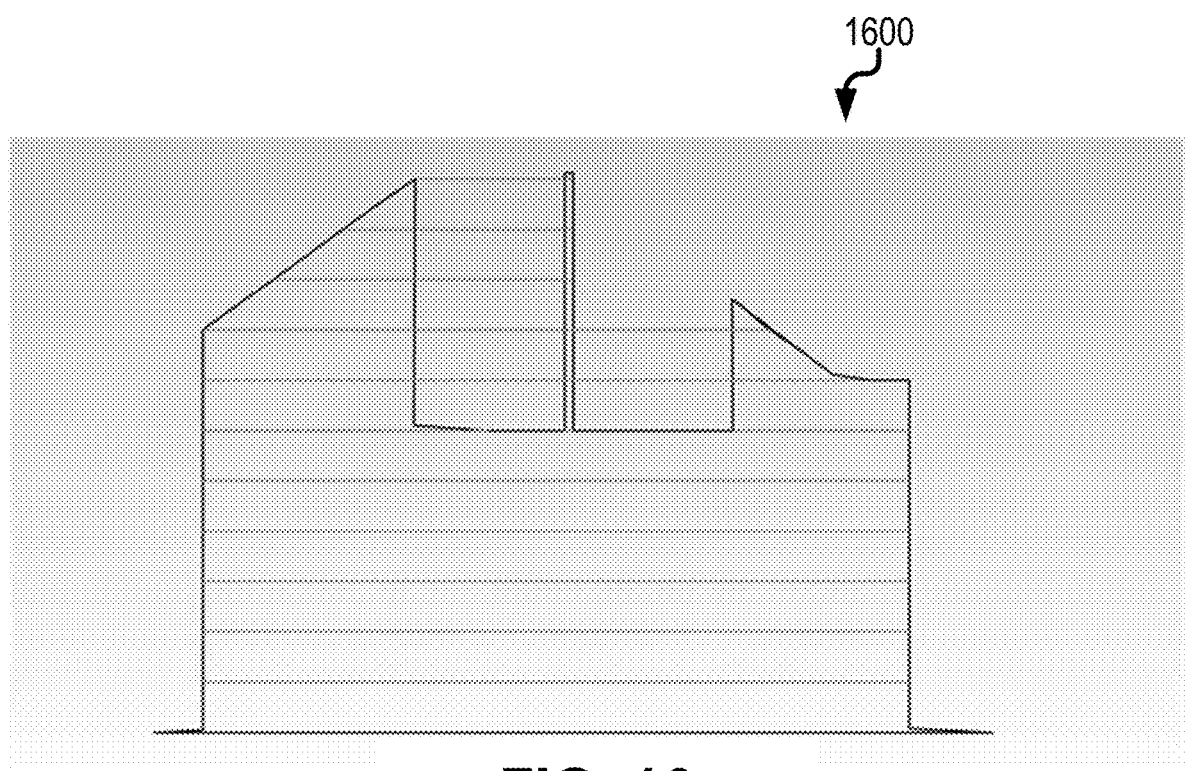
FIG. 16 illustrates a 2D view of an example sliced surface mesh after correction of the overlapping surfaces and prior to the deletion of layer interfaces outside of the surface mesh domain.
Figure 17:
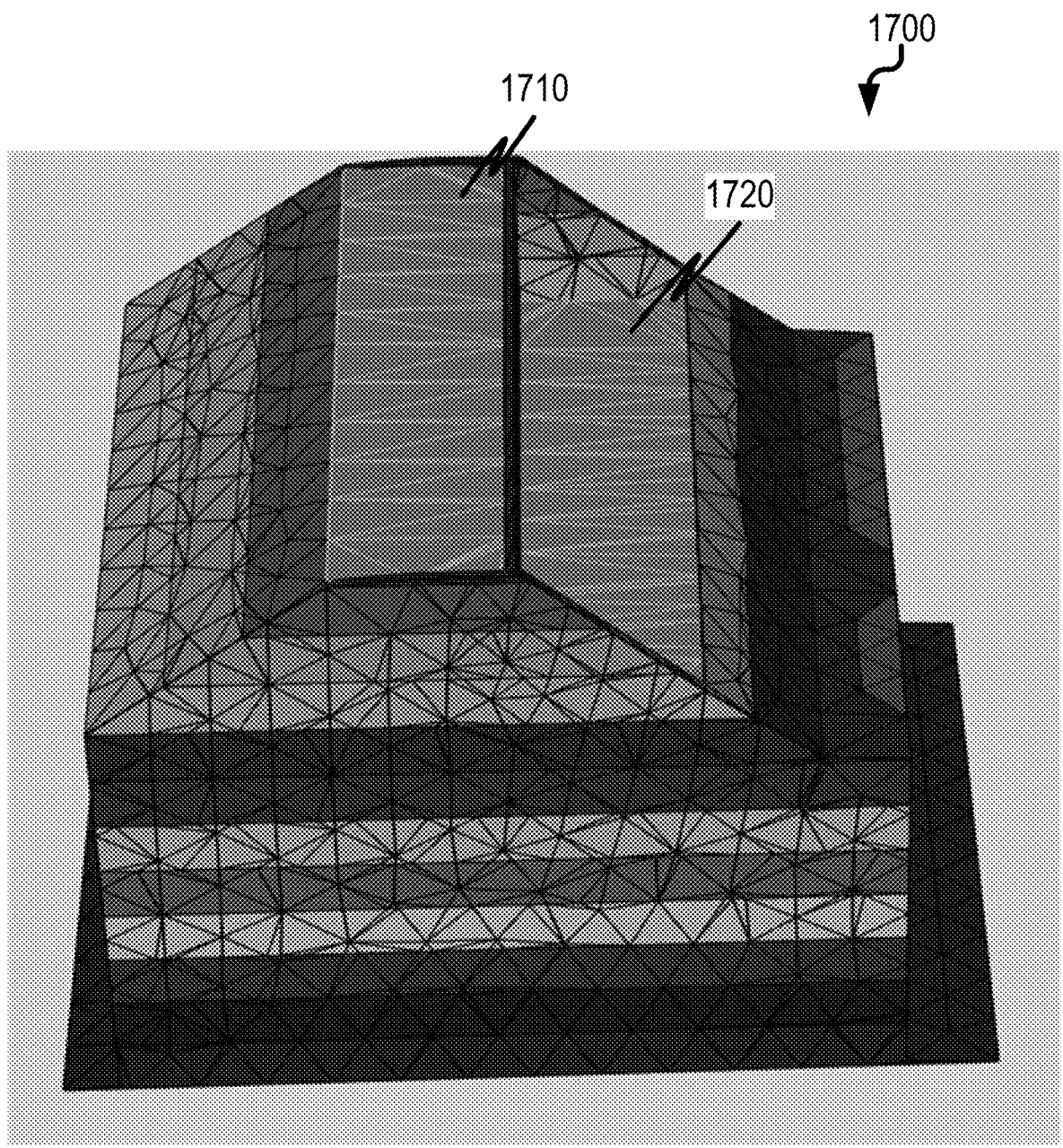
FIG. 17 illustrates a 3D view of an example sliced surface mesh of FIG. 16.
Figure 18:
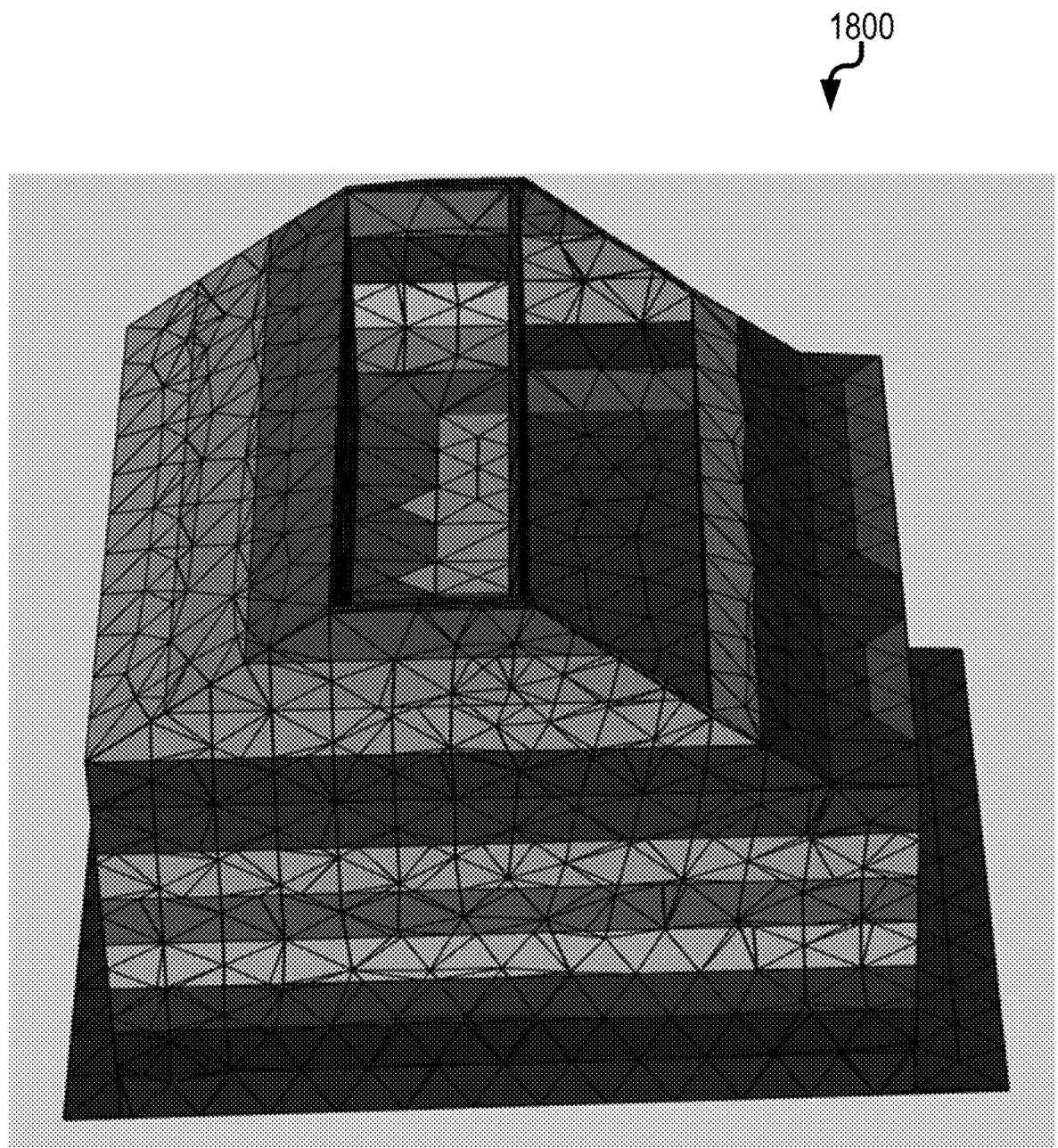
FIG. 18 illustrates an example sliced surface mesh after layer interface cleanup and prior to surface mesh optimization.

FIG. 13 illustrates an example layer interface 1300 created by triangulating join loops 1220, 1230 and intersect loops 1210 created using series of nodes on virtual layer planes. Layer interface 1300 includes layer interface surfaces 1310, 1320 and 1330. Layer interface 1300 is the layer interface created for virtual layer plane 420. The nodes of the surface mesh which are used to create the loops are used for the triangulation, hence the layer interfaces conformally gets connected to surface mesh. The join loops, however, already have join surfaces (e.g., join surfaces 900, 910) connected. For example, the overlap in FIG. 14 illustrates an example layer interface 1400 (i.e., layer interface surfaces 1410, 1420) having overlapping surface mesh (i.e., join surfaces 1320, 1330). These overlapping layer interface surfaces 1320, 1330 are identified and deleted. Layer interface 1300 is conformally connected surface mesh. FIG. 15 illustrates an example layer interface 1500 having the overlapping surfaces corrected by deletion. FIG. 16 illustrates a 2D view of an example sliced surface mesh 1600 after correction of the overlapping surfaces and prior to the deletion of layer interfaces outside of the surface mesh domain. FIG. 17 illustrates a 3D view of an example sliced surface mesh 1600 of FIG. 16. Areas 1710, 1720 represent layer interfaces outside of the domain. Areas 1710, 1720 can be identified using, for example, an auto-identify algorithm which recognizes intersect layer planes exposed to outer space of surface mesh. Once areas 1710, 1720 are identified, then can be deleted. This auto-identification and deletion process can continue until there are no layer interfaces exposed to the outer space of the mesh. FIG. 18 illustrates an example sliced surface mesh 1800 after layer interface cleanup and prior to surface mesh optimization.

Figure 19:
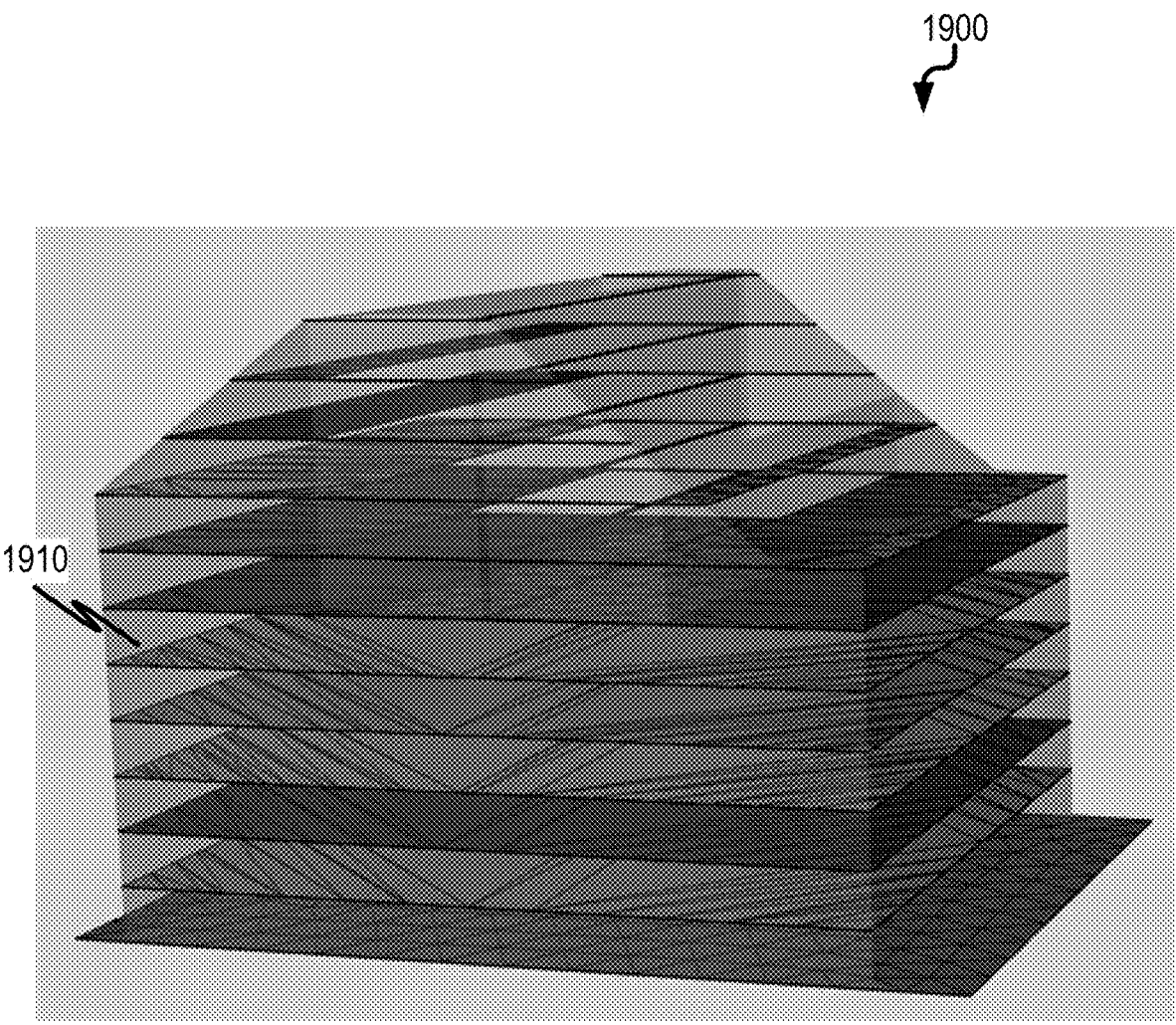
FIG. 19 illustrates a transparent view of a sliced surface mesh with opaque view of layer interfaces.

FIG. 19 illustrates a transparent view of a sliced surface mesh 1900 with opaque view of layer interfaces. Sliced surface mesh 1900 can include deteriorated sections (e.g., area 1910) caused by surface mesh intersection with virtual layer planes and triangulation of join and intersect loops. Sliced surface mesh 1900 can be re-meshed to improve triangle quality. Face quality can be further improved using one or more of smooth, swap, split, and/or collapse algorithms.

FIG. 20A illustrates an example surface mesh 2000 having a number of surface mesh proximal surfaces (i.e., cluster of faces with all nodes with in predetermined distance from layer interfaces) including proximal surfaces 2001, 2003, 2005, 2007. Node inflation (i.e., moving a node to predetermined distance away from layer interface in perpendicular direction of the layer interface) can be performed on face nodes of these proximal surfaces to cure possibility of issues which could lead to volume meshing failures or poor quality volume mesh elements. Hence, node inflation increases the robustness of volume meshing a layered surface mesh. For example, a subset of nodes on proximal surfaces 2001, 2003, 2005, 2007 are moved to a predetermined distance away from a layer interface in perpendicular direction of the layer interface. Node inflation provides customized identification and correction of proximal surfaces. FIG. 20B illustrates a corrected surface mesh 2050 having proximal surfaces 2051, 2053, 2055, 2057 of the surface mesh 2000 of FIG. 20A. Proximal surfaces 2051, 2053, 2055, 2057 have faces proximal to layer interface corrected using node inflation.

Figure 21:
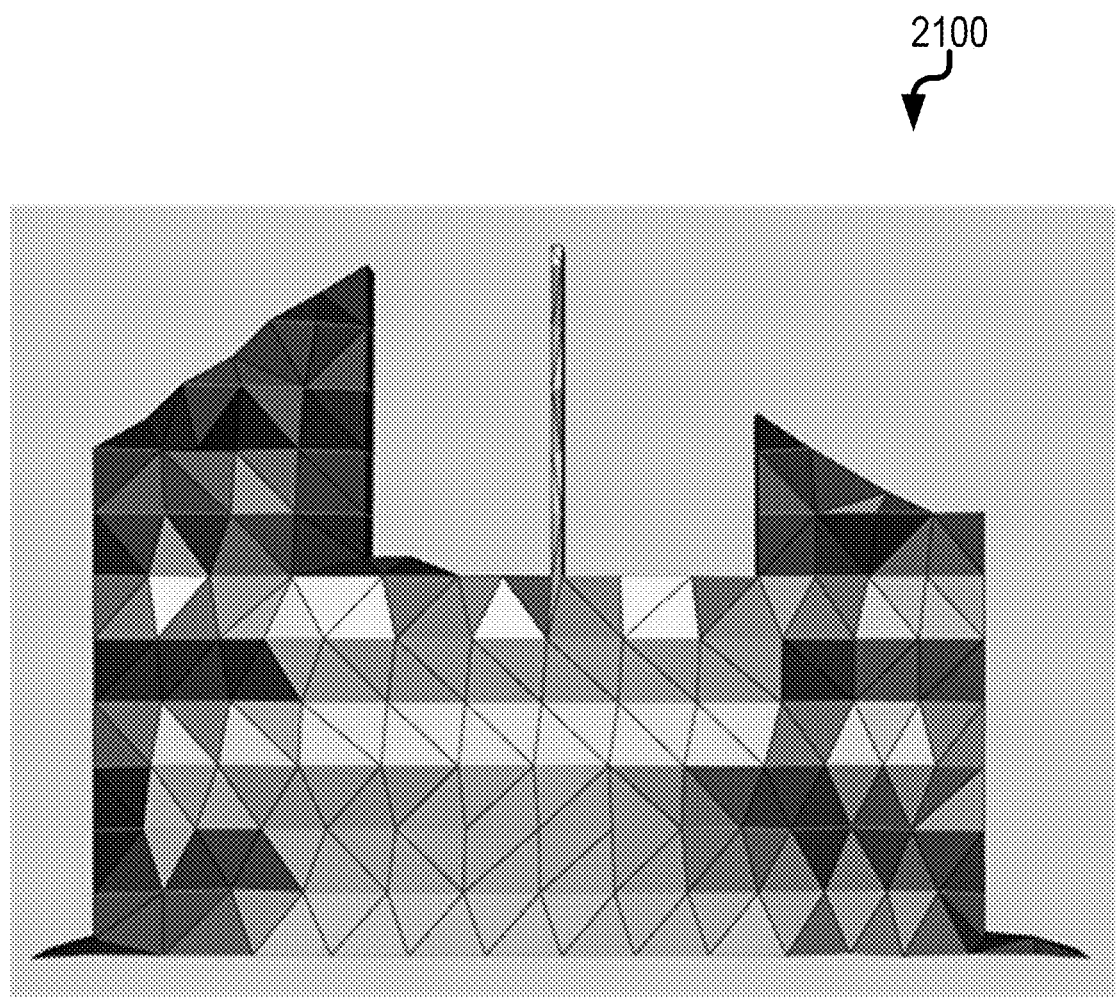
FIG. 21 illustrates a cross-sectional view of example layered volume mesh illustrated in FIG. 1B.

FIG. 21 illustrates a cross-sectional view 2100 of example layered volume mesh illustrated in FIG. 1B.

Figure 22:
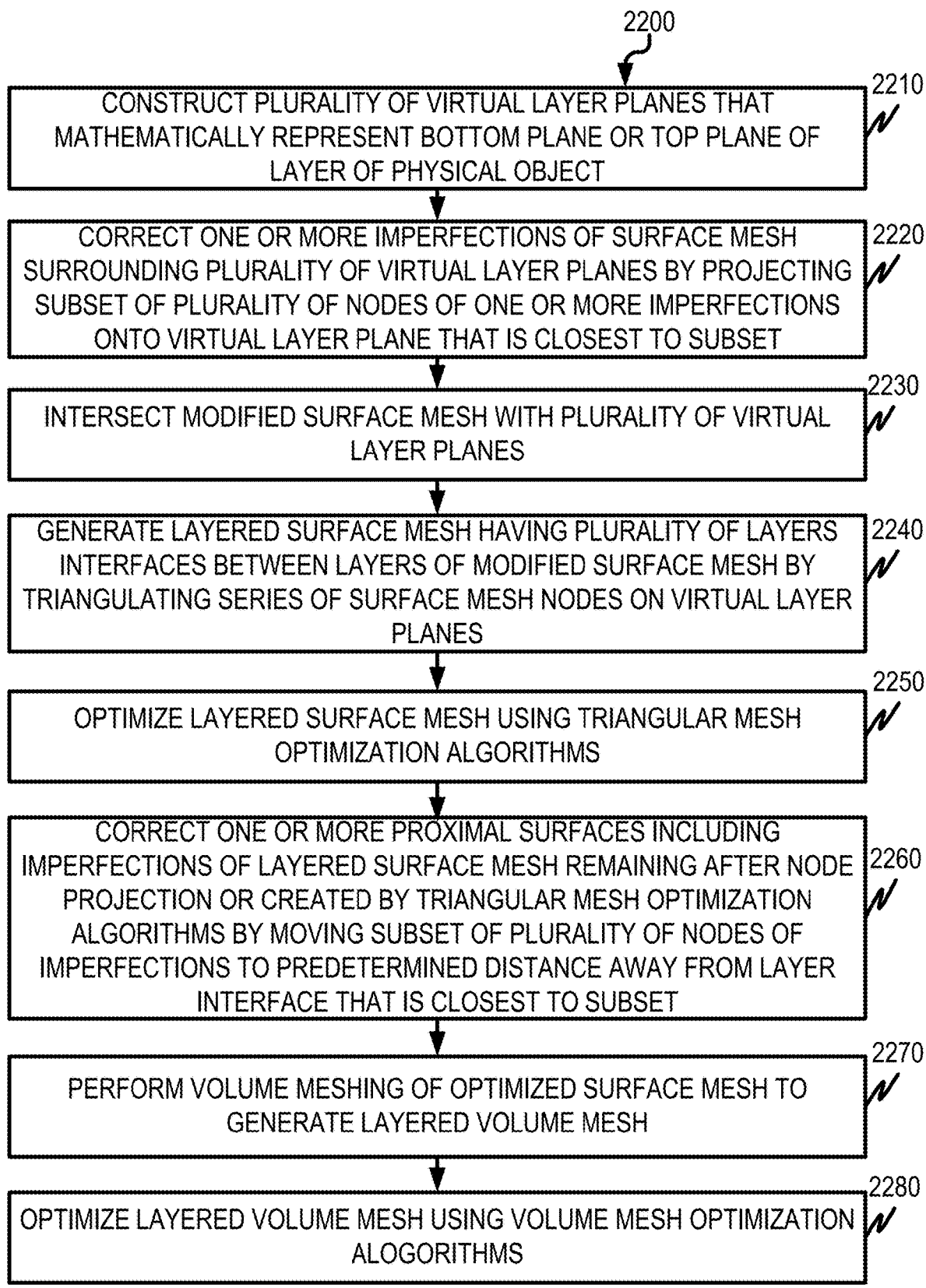
FIG. 22 illustrates an example process flow diagram for generating a layered volume mesh of a physical object to be created by an additive manufacturing process.

FIG. 22 is an example process flow diagram 2200 for generating a layered volume mesh of a physical object to be created by an additive manufacturing process. A plurality of virtual layer planes that mathematically represent a bottom plane or a top plane of a layer of the physical object are constructed, at 2210. Surfaces of the physical object are modeled by a surface mesh comprising a plurality of nodes. One or more imperfections of the surface mesh surrounding the plurality of virtual layer planes are corrected, at 2220, by projecting a subset of the plurality of nodes of the one or more imperfections onto a virtual layer plane of the plurality of the virtual layer planes that is closest to the subset. A modified surface mesh includes the surface mesh having the one or more imperfections corrected. The modified surface mesh is intersected, at 2230, with the plurality of virtual layer planes. A layered surface mesh is generated, at 2240, which includes a plurality of layer interfaces between layers of the modified surface mesh by triangulating a series of surface mesh nodes on the plurality of virtual layer planes. The layered surface mesh is optimized or updated, at 2250, using triangular mesh optimization algorithms. One or more proximal surfaces including imperfections of the layered surface mesh remaining after node projection or created by the triangular mesh optimization algorithms are corrected, at 2260, by moving a subset of the plurality of nodes of the one or more proximal surfaces to a predetermined distance away from layer interface of the plurality of the layer interfaces that is closest to the subset. An optimized or updated surface mesh includes the surface mesh having the one or more proximal surfaces corrected. Volume meshing of the optimized or updated surface mesh is performed, at 2270, to generate the layered volume mesh. The layered volume mesh is optimized, at 2280, using volume mesh optimization algorithms.

Figure 23:
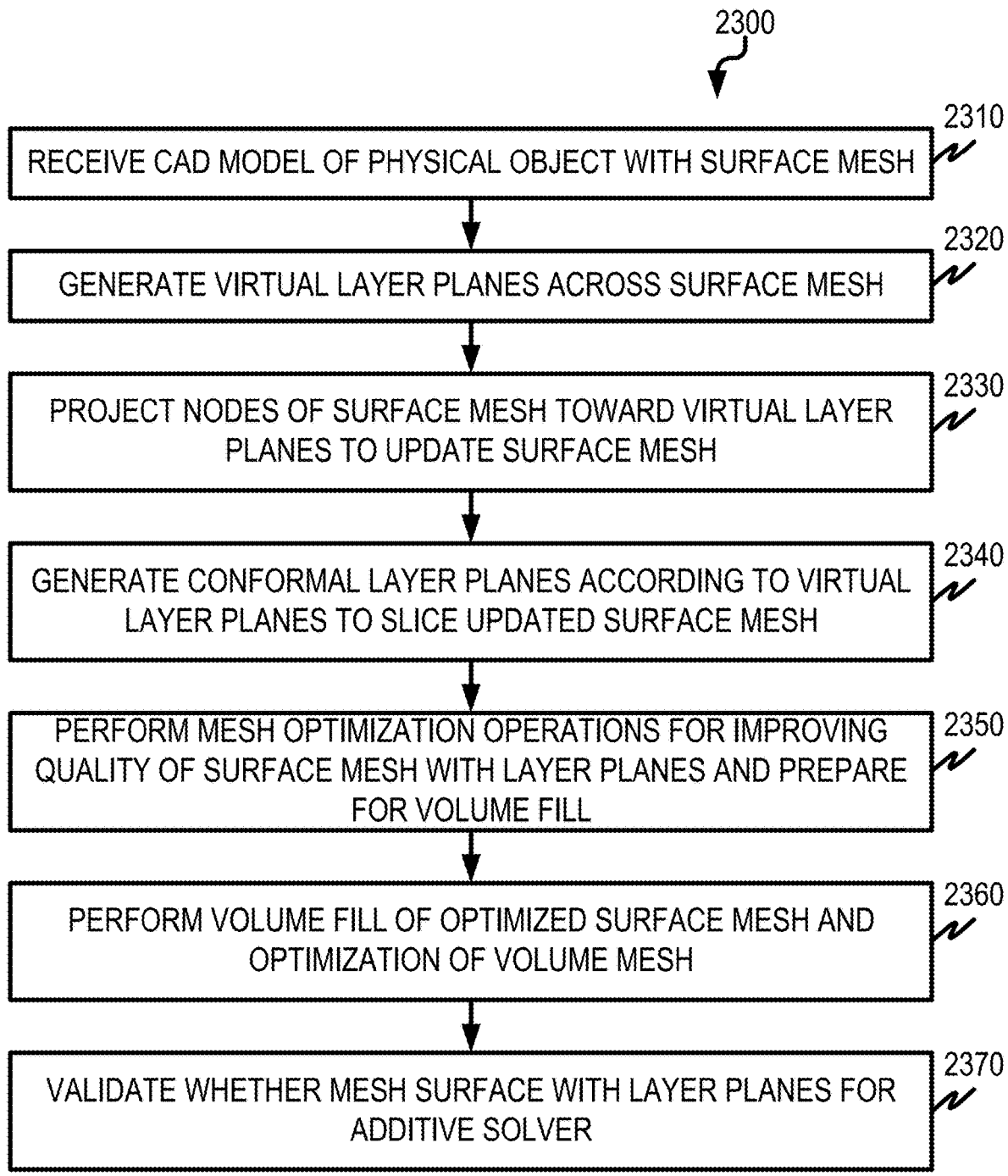
FIG. 23 is another example process flow diagram for generating a layered volume mesh of a physical object to be created by an additive manufacturing process.

FIG. 23 is another example process flow diagram 2300 for generating a layered volume mesh of a physical object to be created by an additive manufacturing process. A CAD model of a physical object is received, at 2310. The CAD model includes a surface mesh representing the physical object. Virtual layer planes are generated, at 2320, across a surface mesh. Nodes of the surface mesh are projected, at 2330, toward the virtual layer planes in order to update the surface mesh. Conformal layer planes according to the virtual layer planes are generated, at 2340, to slice the updated surface mesh. Mesh optimizations for improving the quality of the surface mesh with the layer planes are performed, at 2250, and the surface mesh is prepared (e.g., node inflation of proximal surfaces) for volume filling. Volume filling is performed, at 2260, of the optimized surface mesh and the volume mesh is optimized. Validation occurs, at 2270, to determine whether the mesh surface having the layer planes interfaces with an additive solver.

Figure 24:
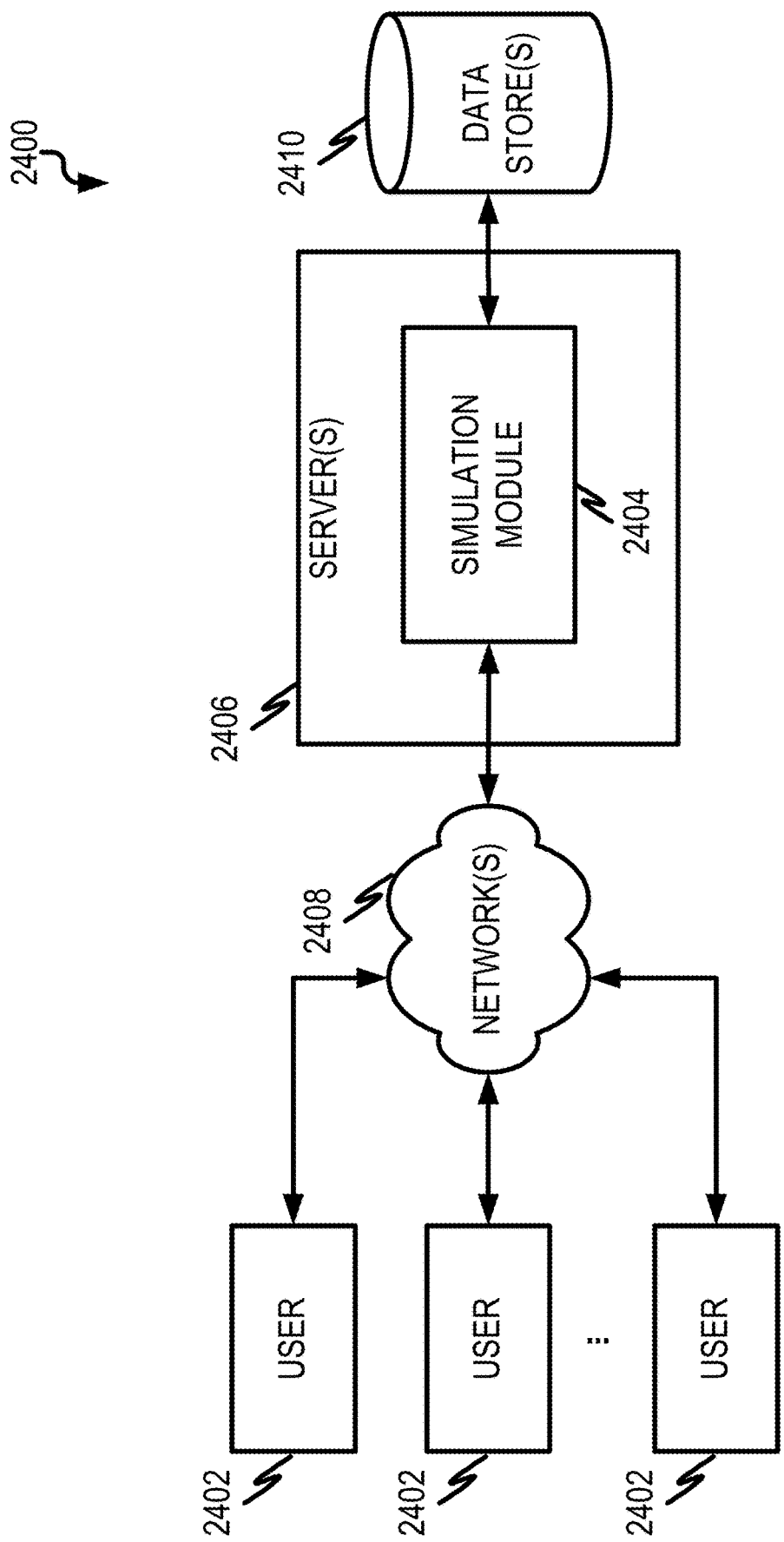
FIG. 24 illustrates an example computer-implemented environment for implementing various aspects described herein.

FIG. 24 illustrates an example computer-implemented environment 2400 wherein users 2402 can interact with a simulation module 2404 having the various additive manufacturing simulation capabilities as described herein hosted on one or more servers 2406 through a network 2408. The simulation module 2404 can assist the users 2402 with interfacing between an object-oriented modeling language based interface and a hardware description language based interface.

As shown in FIG. 24, the users 2402 can interact with the simulation module 2404 through a number of ways, such as over one or more networks 2408. One or more servers 2406 accessible through the network(s) 2408 can host the simulation module 2404. The one or more servers 2406 can also contain or have access to one or more data stores 2410 for storing data for the simulation module 2404.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 25:
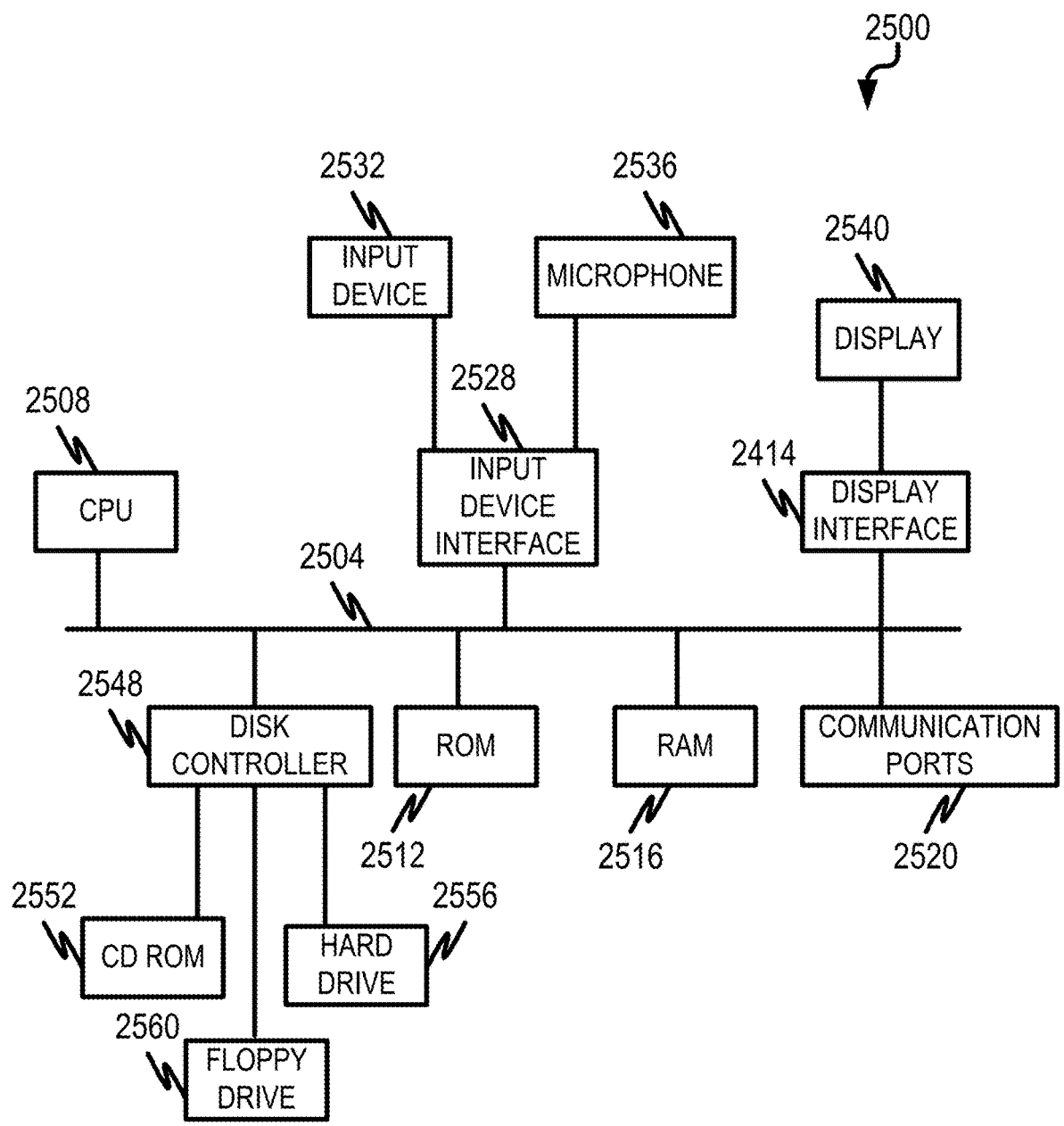
FIG. 25 illustrates an example computing architecture for implementing various aspects described herein.

FIG. 25 is a diagram 2500 illustrating a sample computing device architecture for implementing various aspects described herein. A bus 2504 can serve as the information highway interconnecting the other illustrated components of the hardware. A processing system 2508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 2512 and random access memory (RAM) 2516, can be in communication with the processing system 2508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 2548 can interface one or more optional disk drives to the system bus 2504. These disk drives can be external or internal floppy disk drives such as 2560, external or internal CD-ROM, CD-R, CD-RW or DVD, or solid state drives such as 2552, or external or internal hard drives 2556. As indicated previously, these various disk drives 2552, 2556, 2560 and disk controllers are optional devices. The system bus 2504 can also include at least one communication port 2520 to allow for communication with external devices either physically connected to the computing system or available externally through a wired or wireless network. In some cases, the communication port 2520 includes or otherwise comprises a network interface.

To provide for interaction with a user, the subject matter described herein can be implemented on a computing device having a display device 2540 (e.g., a CRT (cathode ray tube) or LCD (liquid crystal display) monitor) for displaying information obtained from the bus 2504 to the user and an input device 2532 such as keyboard and/or a pointing device (e.g., a mouse or a trackball) and/or a touchscreen by which the user can provide input to the computer. Other kinds of input devices 2532 can be used to provide for interaction with a user as well; for example, feedback provided to the user can be any form of sensory feedback (e.g., visual feedback, auditory feedback by way of a microphone 2536, or tactile feedback); and input from the user can be received in any form, including acoustic, speech, or tactile input. In the input device 2532 and the microphone 2536 can be coupled to and convey information via the bus 2504 by way of an input device interface 2528. Other computing devices, such as dedicated servers, can omit one or more of the display 2540 and display interface 2514, the input device 2532, the microphone 2536, and input device interface 2528.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A system comprising:
one or more data processors; and
memory storing instructions stored on one or more data processors, which when executed result in operations comprising:
slicing and layering a surface mesh representing a physical object according to a plurality of virtual layer planes, wherein the surface mesh comprises a plurality of nodes, wherein the virtual layer planes represent bottom and top planes of a layer of the physical object;
updating the surface mesh with a plurality of conformal layer interfaces generated according to the plurality of virtual layer planes, the updating comprising correcting imperfections of the surface mesh that correspond to one or more elements of the surface mesh that satisfy one or more conditions related to spatial relations between the elements and/or with respect to a virtual layer plane; and
performing volume meshing of the updated surface mesh to generate the layered volume mesh, the layered volume mesh being used to create the physical object by a computer-implemented additive manufacturing process.

2. The system of claim 1, wherein the updating comprises:
projecting a subset of the plurality of nodes to the plurality of virtual layer planes, one of the subset of the plurality of nodes being within a predetermined distance from one of the virtual layer planes, wherein the one node is moved onto the one virtual layer plane.

3. The system of claim 1, wherein the operations further comprise:
receiving a computer-aided design (CAD) model of the physical object, wherein the CAD model includes the surface mesh representing the physical object;
generating the plurality of virtual layer planes;
performing mesh optimizations for improving a quality of the updated surface mesh with the plurality of layer interfaces;
preparing the updated surface mesh for volume filling by performing node inflation of proximal surfaces for volume filling; and
validating the mesh surface having the plurality of layer interfaces using the virtual layer planes.

4. The system of claim 1, wherein each virtual layer plane of the plurality of virtual layer planes is defined by: $z=b+nh$, wherein z represents the virtual layer plane, b represents a base of the virtual layer plane, n is a current layer number, and h is a height of a virtual layer.

5. The system of claim 2, wherein the update comprises:
identifying overlapping surfaces caused by the projecting; and
moving nodes of the overlapping surfaces to original positions prior to the update, wherein the plurality of nodes comprises the nodes of the overlapping surfaces.

6. The system of claim 1, wherein the update comprises:
identifying surfaces of the surface mesh, the identified surfaces having all nodes of the surfaces within a virtual layer plane, wherein each surface corresponds to a join surface; and
generating a join loop from the join surfaces, the join loop generated based on interconnected edges of the surfaces passing through outer nodes of each join surface.

7. The system of claim 1, wherein the operations further comprise:
displaying, on a display, a visual representation of the generated layered volume mesh.

8. The system of claim 1, wherein, after the generating of the plurality of virtual layer planes, the plurality of nodes of the surface mesh are projected toward the plurality of virtual layer planes in order to update the surface mesh.

9. A computer-implemented method comprising:
constructing a plurality of virtual layer planes that represent a bottom plane and a top plane of a layer of a physical object, wherein surfaces of the physical object are modeled by a surface mesh comprising a plurality of nodes;
correcting one or more proximal surfaces having imperfections of the surface mesh surrounding the plurality of virtual layer planes by projecting a subset of the plurality of nodes of the one or more imperfections onto a virtual layer plane of the plurality of the virtual layer planes that is closest to the subset, wherein the imperfections of the surface mesh correspond to one or more elements of the surface mesh that satisfy one or more conditions related to spatial relations between the elements and/or with respect to a corresponding virtual layer plane, wherein a modified surface mesh comprises the surface mesh having the one or more proximal surfaces corrected;
generating a layered surface mesh comprising a plurality of layer interfaces between layers of the modified surface mesh by triangulating a series of surface mesh nodes on the plurality of virtual layer planes based on intersections between the modified surface mesh and the plurality of virtual layer planes;
updating the layered surface mesh using triangular mesh optimization algorithms;
correcting one or more proximal surfaces of the updated layered surface mesh by moving a subset of the plurality of nodes of the one or more proximal surfaces to a predetermined distance away from layer interface of the plurality of the layer interfaces that is closest to the subset, wherein an optimized surface mesh comprises the surface mesh having the one or more proximal surfaces corrected;
performing volume meshing of the optimized surface mesh to generate the layered volume mesh; and
updating the layered volume mesh using volume mesh optimization algorithms, the updated layered volume mesh being used to create the physical object by an additive manufacturing process.

10. A computer-implemented method comprising:
identifying a plurality of virtual layer planes slicing across a surface mesh representing a bottom plane and a top plane of a layer of a physical object, wherein the surface mesh comprises a plurality of nodes;
modifying the surface mesh by projecting a subset of the plurality of nodes to the plurality of virtual planes, one of the subset of the plurality of nodes being within a predetermined distance from one of the virtual layer planes, wherein the one of the subset of the plurality of nodes is moved onto the one of the virtual layer planes, the modifying comprising correcting imperfections of the surface mesh that correspond to one or more elements of the surface mesh that satisfy one or more conditions related to spatial relations between the elements and/or with respect to a virtual layer plane;
generating a plurality of conformal layer interfaces according to the plurality of virtual layer planes, wherein the plurality of conformal layer interfaces slice the updated surface mesh; and performing volume meshing of the modified surface mesh to generate the layered volume mesh, the layered volume mesh being used to create the physical object by an additive manufacturing process.

11. The computer-implemented method of claim 10, wherein each virtual layer plane of the plurality of virtual layer planes is defined by: z=b+nh, wherein z represents the virtual layer plane, b represents a base of the virtual layer plane, n is a current layer number, and h is a height of a virtual layer.

12. The computer-implemented method of claim 10, further comprising:

displaying, on a display, a visual representation of the generated layered volume mesh.

13. The computer-implemented method of claim 10, further comprising:

receiving a computer-aided design (CAD) model of the physical object, wherein the CAD model includes a surface mesh representing the physical object.

14. The computer-implemented method of claim 10, further comprising:

generating the plurality of virtual layer planes of the surface mesh.

15. The computer-implemented method of claim 10, wherein the plurality of nodes of the surface mesh are projected toward the plurality of virtual layer planes in order to update the surface mesh.

16. The computer-implemented method of claim 10, further comprising:

generating a plurality of conformal layer interfaces according to the plurality of virtual layer planes, wherein the plurality of conformal layer interfaces slice the updated surface mesh.

17. The computer-implemented method of claim 10, wherein the modification comprises:

identifying overlapping surfaces caused by the projecting; and moving nodes of the overlapping surfaces to original positions prior to the modifying, wherein the plurality of nodes comprises the nodes of the overlapping surfaces.

18. The computer-implemented method of claim 10, further comprising:

identifying surfaces having all nodes of the surfaces within a virtual layer plane, wherein each surface corresponds to a join surface; and generating a join loop from the join surfaces, the join loop generated based on interconnected edges of the surfaces passing through outer nodes of each join surface.

19. The computer-implemented method of claim 10, further comprising:

performing mesh optimizations for improving a quality of the surface mesh with the plurality of layer interfaces.

20. The computer-implemented method of claim 10, further comprising:

preparing the surface mesh for volume filling by performing node inflation of proximal surfaces for volume filling; and validating the mesh surface having the plurality of layer interfaces using the virtual layer planes.

* * * * *